United States Patent
Harada et al.

(10) Patent No.: US 8,194,525 B2
(45) Date of Patent: Jun. 5, 2012

(54) INFORMATION STORAGE MEDIUM, INFORMATION READ/WRITE DEVICE, COORDINATION SYSTEM, CONTROL PROGRAM FOR THE DEVICE OR SYSTEM, AND COMPUTER-READABLE STORAGE MEDIUM

(75) Inventors: Yasuhiro Harada, Osaka (JP); Shigemi Maeda, Osaka (JP); Hideharu Tajima, Osaka (JP); Tetsuya Hayashi, Osaka (JP); Atsushi Etoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 85 days.

(21) Appl. No.: 12/644,687

(22) Filed: Dec. 22, 2009

(65) Prior Publication Data

US 2010/0165808 A1   Jul. 1, 2010

(30) Foreign Application Priority Data

Dec. 26, 2008  (JP) ................................ 2008-334748

(51) Int. Cl.
   *G11B 7/00*  (2006.01)
(52) U.S. Cl. ................. 369/275.1; 369/275.2; 369/53.2; 369/53.45
(58) Field of Classification Search .................. None
   See application file for complete search history.

(56) References Cited

U.S. PATENT DOCUMENTS

| | | | |
|---|---|---|---|
| 5,946,277 A | 8/1999 | Kuroda et al. | |
| 7,940,613 B2 * | 5/2011 | Nakamura | 369/47.14 |
| 2003/0231567 A1 | 12/2003 | Moritomo | |
| 2003/0235000 A1 | 12/2003 | Takayama | |

FOREIGN PATENT DOCUMENTS

| | | |
|---|---|---|
| JP | 09-139022 | 5/1997 |
| JP | 10-079165 | 3/1998 |
| JP | 10-208394 | 8/1998 |
| JP | 2000-099338 | 4/2000 |
| JP | 2003-016648 | 1/2003 |
| JP | 2003-068052 | 3/2003 |
| JP | 2004-022045 | 1/2004 |
| JP | 2007-094590 | 4/2007 |
| WO | 2007/010827 | 1/2007 |

* cited by examiner

*Primary Examiner* — Muhammad N Edun
(74) *Attorney, Agent, or Firm* — David G. Conlin; Steven M. Jensen; Edwards Wildman Palmer LLP

(57) ABSTRACT

There are provided at least a first information storage area 20A and a second information storage area 40A. The first information storage area 20A contains, in advance, an OS or mpeg data. The second information storage area 40A is either write-once or rewriteable and available for writing OS update information or movie correction information. The configuration enables easy backup and restoration of software, content, and various information including update information for use by the software and content with reduced user time and workload.

14 Claims, 8 Drawing Sheets

FIG. 1

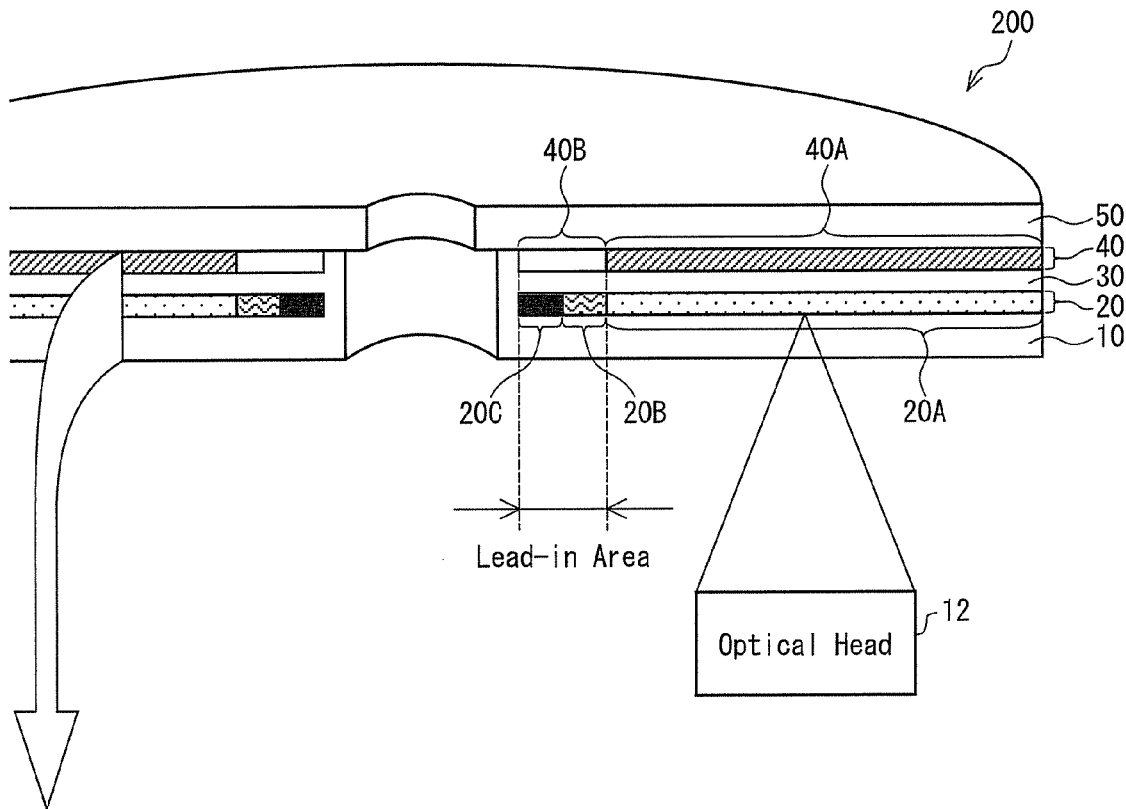

| Memory Area | Layer | Stored Info. |
|---|---|---|
| First Information Storage Area 20A | First Information Recording Layer 20 | OS (Operating System) |
| Second Information Storage Area 40A | Second Information Recording Layer 40 | OS Update Information |
| Third Information Storage Area 40B | Lead-in Area for Second Information Recording Layer 40 | File Management Information |
| Fourth Information Storage Area 20B | Lead-in Area for First Information Recording Layer 20 | Backup Program |
| Fifth Information Storage Area 20C | Lead-in Area for First Information Recording Layer 20 | Restoration Program |

FIG. 2 (a)

| File Management Information | |
|---|---|
| Symbol | Content |
| FILE_NAME | File Name |
| FILE_ADR | Starting Point for Physical File Address |
| FILE_TYPE | File Type |
| FILE_SIZE | File Size |
| FILE_UPD | Time and Date of File Updating |
| ･･･ | ･･･ |

FIG. 2 (b)

| FILE 1 | |
|---|---|
| FILE_NAME | OS Update Information |
| FILE_ADR | XX1・・・ |
| FILE_TYPE | OS |
| FILE_SIZE | YY1Y |
| FILE_UPD | 2008/12/11 18:00 |
| ･･･ | ･･･ |

FIG. 2 (c)

| FILE 2 | |
|---|---|
| FILE_NAME | Movie Correction Information |
| FILE_ADR | XX2・・・ |
| FILE_TYPE | mpeg |
| FILE_SIZE | YY2Y |
| FILE_UPD | 2008/12/11 |
| ･･･ | ･･･ |

FIG. 2 (d)

| FILE 3 | |
|---|---|
| FILE_NAME | OS Update Information |
| FILE_ADR | XX3・・・ |
| FILE_TYPE | OS |
| FILE_SIZE | YY3Y |
| FILE_UPD | 2008/12/12 11:05 |
| ･･･ | ･･･ |

# INFORMATION STORAGE MEDIUM, INFORMATION READ/WRITE DEVICE, COORDINATION SYSTEM, CONTROL PROGRAM FOR THE DEVICE OR SYSTEM, AND COMPUTER-READABLE STORAGE MEDIUM This nonprovisional application claims priority under 35 U.S.C. §119(a) on Patent Application No. 2008/334748 filed in Japan on Dec. 26, 2008, the entire contents of which are hereby incorporated by reference.

TECHNICAL FIELD

The present invention relates to an information storage medium having information storage areas for storing various information, an information read/write device capable of writing or reading information on the information storage medium, a coordination system coordinating the operation of the information read/write device and an information communications device which has communications capability, a control program for the devices or system, and a computer-readable storage medium containing the control program.

BACKGROUND ART

A popular, conventional remedy to possible damage to the OS (operating system) installed on a PC (personal computer) or application data is to back up data by storing an exact copy of the data on a separate storage medium so that the data can be restored to its original condition (restored) from the backup files and data.

The data can be backed up, for example, on a storage medium outside the PC, in a server that is network-connected to the PC, or a hard disk device or like storage device connected to the PC.

An exemplary technology related to the backup or restoration is the data backup method disclosed in patent literature 1.

According to the data backup method disclosed in patent literature 1, there are provided two memory areas in a partition so that the content in one of the memory areas can be copied to the other memory area as a backup. PC novices and elders, who may not understand the meaning of partitions, can thus readily back up data. "Partitions" are sections of a hard disk created by means of software to offer a plurality of drives.

CITATION LIST

Patent Literature 1
Japanese Patent Application Publication, Tokukai, No. 2007-94590 (Publication Date: Apr. 12, 2007)

SUMMARY OF INVENTION

Recently, with the growing use of the Internet, update and other information is frequently installed, for example, over the Internet in increasingly more occasions for the purpose of improved security and updating of the OS and applications for better use.

The update information and user settings for the OS and applications contained in the PC's HDD (hard disk drive) are currently typically stored in the same HDD as the one containing the OS and applications Therefore, if the HDD is broken losing the update information for the OS and applications, they are restored, for example, by first reinstalling the OS and applications per se from installation discs to have them back to their initial condition (including no updates) and then directly reinstalling the update information from a delivery source of the update information on the Internet. That requires very complex procedures.

Meanwhile, to restore the lost OS and applications for a PC which has no connection or is no longer connectable to the Internet, a backup storage medium should be prepared in advance to make a backup before the OS and applications are lost so that reinstallation can be carried out using the backup storage medium.

In addition, as mentioned earlier, the lost update information is usually not backed up. To restore the update information is even more troublesome: for example, the user needs to request the creator of the update information to resend it by mail.

The problem is especially serious with the user settings for the OS and applications which can usually not be backed up. The user must again make the settings after installation of the OS and applications.

If optical discs with small storage are used as backup storage media, for example, the user needs to repeatedly exchange optical discs during backup or installation to back up or reinstall the OS. That places large workload on the user. Furthermore, since many optical discs need to be separately prepared, extra cost is needed for the backup.

As described in the foregoing, if the OS and application software and their update information and user settings are lost from the HDD, so much time and work is required to restore them to their original condition.

Meanwhile, in recent years, optical discs and like optical information storage media boast increasingly large storage capacity. For example, a DVD-ROM (digital versatile disc read only memory) can record about 200 minutes of video/audio data.

Further development in Blu-ray Disc® and other advanced technology will add to the storage capacity of the optical disc. A single optical disc would have enough capacity to contain up to tens of hours of video/audio data.

Under these conditions, one would highly likely use a single optical disc as a backup storage medium to make a backup for the OS or restore data from the disc.

As mentioned earlier, upon installation, various information (including update information) for use by the software is distributed as physically and temporally independent information from the OS and application software. When damaged due to HDD failure or other causes, however, they are all in the same boat.

In addition, as mentioned above, since the update information, etc. is, upon installation, distributed as physically and temporally independent information from the OS and application software. It is stored in the HDD in a physically and temporally random manner, being mixed with other unrelated information.

The present invention is conceived to address these conventional problems and has an objective of providing an information storage medium, an information read/write device, a coordination system, a control program for the devices or system, and a computer-readable storage medium, which enable easy backup and restoration of software, content, and various information including update information for use by the software and content with less user time and workload.

An information storage medium of the present invention is, to address the problems, characterized in that it is an information-readable information storage medium including at least a first information storage area and a second information storage area, wherein: the first information storage area contains, in advance, first information which is software or content; and the second information storage area is either write-once or rewriteable and available for writing second information for use by the first information.

According to the configuration, a single information storage medium containing first information (software or content) in the first information storage area in advance can also store second information for use by the first information in the second information storage area.

The first information may be of a single type or plural types. There may be plural sets of second information for one type of first information. For example, there may be plural sets of second information, with different dates and times of creation or those of update, for one type of first information.

Therefore, there is no need to prepare a separate backup storage medium to which to write the second information. Physical and temporal separation of the first and second information is prevented as much as possible. User time and workload are reduced, and low cost backup becomes possible.

Since the user knows that the second information is written to the second information storage area of the medium, the user does not have to bother to reinstall the second information after searching for the recorded second information, unlike when the second information is written in a physically and temporally random manner.

In addition, if an arrangement is made so that the latest version of the second information is always stored, trouble in restoration becomes unnecessary. Reliable restoration is thus ensured including the reinstallation of the second information for use by the first information.

As detailed above, the software, the content, and the second information for use by the software and content can be readily backed up and restored with less user time and workload using the single optical information storage medium.

An "information storage medium" refers among others to a magnetic storage medium which exploits magnetism and an optical information storage medium which exploits light.

"Software" refers to computer programs written as such a combination of instructions as to run a computer and includes OS's and other application software.

"Content" is information that can be processed by the computer and inclusive of data collected in a database, images, movies, music, audio data, other various information that can be processed by software.

"To back up" or "to make a back up" is an act of writing an exact copy of original data in another storage device or medium in case of damage to the data due to system failure or other causes.

"Restoration" is an act of restoring original data from backed-up files and data.

An information read/write device of the present invention is, to address the problems, characterized in that it is an information read/write device writing/reading information on an information-readable information storage medium including at least a first information storage area and a second information storage area, wherein: the first information storage area contains, in advance, first information which is software or content; and the second information storage area is either write-once or rewriteable and available for writing second information for use by the first information, the device including: a storage section for storing information; second information verification means for verifying whether the storage section contains or does not contain the second information; and writing control means for, if the second information verification means has verified that the storage section contains the second information, writing the second information to the second information storage area of the information storage medium.

According to the configuration, the second information verification means verifies whether or not the storage section of the information read/write device contains the second information.

If the second information verification means has confirmed that the storage section contains the second information, the writing control means writes the second information to the second information storage area of the information storage medium.

Thus, the information read/write device of the present invention can make a backup by writing the second information stored in the storage section of the information read/write device to the second information storage area of the information storage medium.

In addition, unnecessary backup is not carried out since the backup is done only if the second information verification means has confirmed that the storage section contains the second information.

Another information read/write device of the present invention is, to address the problems, characterized in that it is an information read/write device writing/reading information on an information-readable information storage medium including at least a first information storage area and a second information storage area, wherein: the first information storage area contains, in advance, first information which is software or content; and the second information storage area is either write-once or rewriteable and available for writing second information for use by the first information, the device including: a storage section for storing information; first information verification means for verifying whether the storage section contains or does not contain the first information; second information verification means for verifying whether the storage section contains or does not contain the second information; writing control means for, if the first information verification means has verified that the storage section does not contain the first information, storing the first information in the storage section or for, if the second information verification means has verified that the storage section does not contain the second information, storing the second information in the storage section.

According to the configuration, the first information verification means checks if the storage section of the information read/write device contains the first information. The second information verification means checks if the storage section of the information read/write device contains the second information.

If the first information verification means has confirmed that the storage section does not contain the first information, the writing control means stores the first information in the storage section. On the other hand, if the second information verification means has confirmed that the storage section does not contain the second information, the writing control means stores the second information in the storage section.

Thus, the information read/write device of the present invention can perform restoration by storing the first information stored in the first information storage area of the information storage medium or the second information written to the second information storage area of the information storage medium to the storage section of the information read/write device.

Restoration is performed only if the first information verification means has confirmed that the storage section of the information read/write device does not contain the first information or if the second information verification means has confirmed that the storage section of the information read/write device does not contain the second information. Unnecessary restoration is thus prevented.

An information storage medium of the present invention, as described in the foregoing, is an information-readable information storage medium including at least a first information storage area and a second information storage area, wherein: the first information storage area contains, in advance, first information which is software or content; and the second information storage area is either write-once or rewriteable and available for writing second information for use by the first information.

An information read/write device of the present invention, as described in the foregoing, includes: a storage section for storing information; second information verification means for verifying whether the storage section contains or does not contain the second information; and writing control means for, if the second information verification means has verified that the storage section contains the second information, writing the second information to the second information storage area of the information storage medium.

Another information read/write device of the present invention, as described in the foregoing, includes: a storage section for storing information; first information verification means for verifying whether the storage section contains or does not contain the first information; second information verification means for verifying whether the storage section contains or does not contain the second information; and writing control means for, if the first information verification means has verified that the storage section does not contain the first information, storing the first information in the storage section or for, if the second information verification means has verified that the storage section does not contain the second information, storing the second information in the storage section.

Therefore, the software, content, and various information including update information for use by the software and content can be easily backed up and restored with less user time and workload.

Additional objectives, advantages and novel features of the invention will be set forth in part in the description which follows, and in part will become apparent to those skilled in the art upon examination of the following or may be learned by practice of the invention. For a fuller understanding of the nature and advantages of the invention, reference should be made to the ensuing detailed description taken in conjunction with the accompanying drawings.

BRIEF DESCRIPTION OF DRAWINGS

FIG. 1 is a schematic illustration showing an information storage medium structure, recorded data, and a brief description of content according to an embodiment of the present invention.

FIG. 2(a) is a schematic diagram showing an example of attribute information in file management information for the information storage medium.

FIG. 2(b) is a schematic diagram showing an example of attribute information for a single file in the file management information for the information storage medium.

FIG. 2(c) is a schematic diagram showing another example of attribute information for the single file.

FIG. 2(d) is a schematic diagram showing a further example of attribute information for the single file.

DESCRIPTION OF EMBODIMENTS

Figure 3:
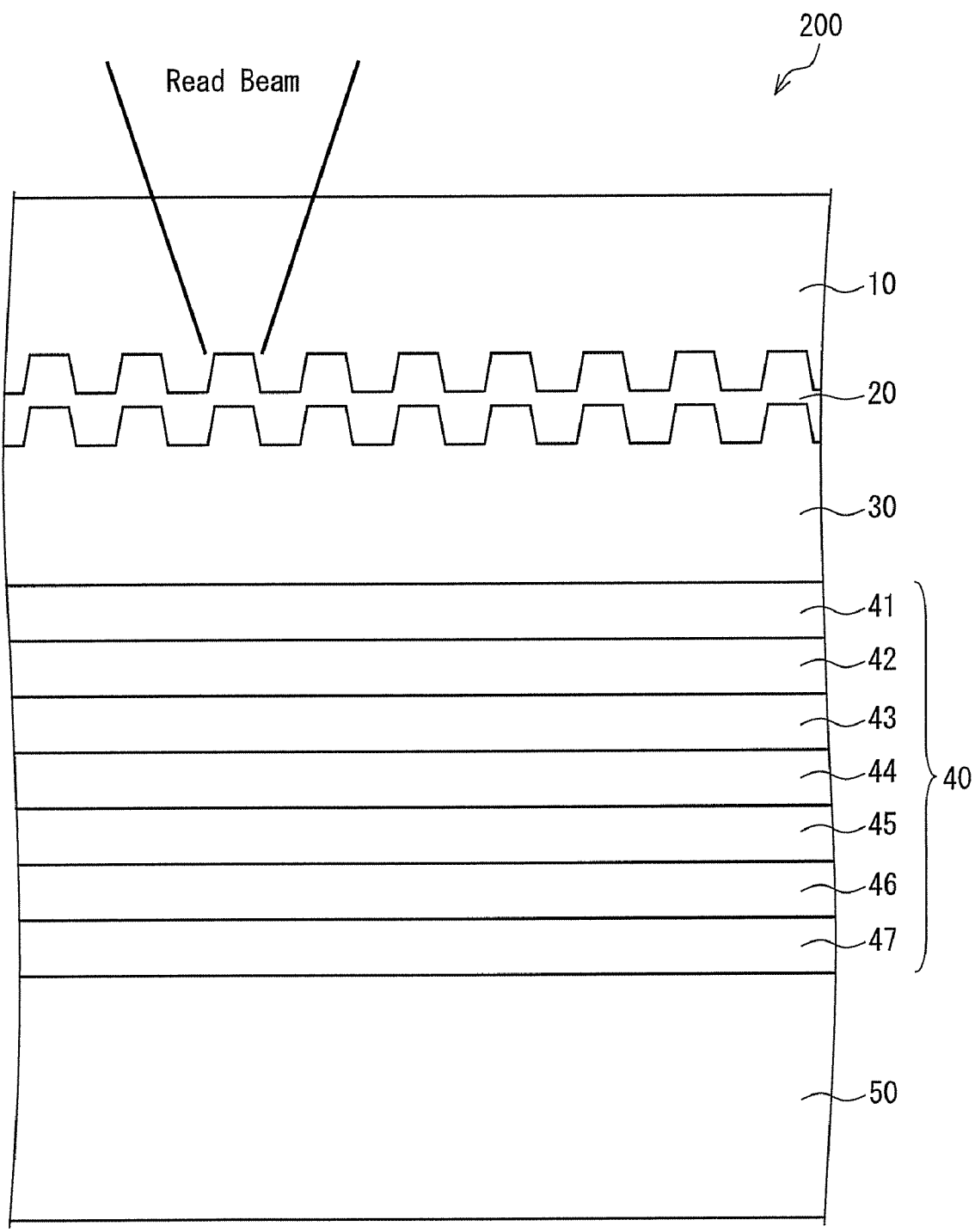
FIG. 3 is a schematic illustration showing a structure of an information storage medium according to another embodiment of the present invention.

The following will describe embodiments of the present invention in reference to FIGS. 1 to 8.

1. Structural Overview, Recorded Information, and Contents on Information Storage Medium Referring first to FIG. 1, the structure of an optical information storage medium (information storage medium) 200 will be described which is an embodiment of the present invention. FIG. 1 is a schematic, conceptual illustration of the structural overview, recorded information, and contents on the optical information storage medium 200 of the present embodiment.

The optical information storage medium 200 according to the present embodiment, as shown in the top of FIG. 1, contains a transparent layer 10, a first information recording layer (read-only layer, information recording layer) 20, an intermediate layer 30, a second information recording layer (write-once or rewriteable layer, information recording layer) 40, and a substrate 50 in this order when the disc is viewed from the side hit by an incident read beam coming from an optical head 12. In other words, if viewed from the top end of the page, the second information recording layer 40, the intermediate layer 30, the first information recording layer 20, and the transparent layer 10 are stacked in this order on the substrate 50.

The information in the first information recording layer 20 and the second information recording layer 40 can be read with a read beam.

Although the optical information storage medium 200 contains only two information recording layers: the first information recording layer 20 and the second information recording layer 40. Alternatively, there may be provided 3 or more information recording layers.

The first information recording layer 20 is "read-only." Data can only be read (ROM layer, read only memory layer).

The second information recording layer 40 is either "write once" or "rewriteable." Data can either be written once (R layer, recordable layer) or written repeatedly (RE layer, rewriteable layer).

The transparent layer 10, the first information recording layer 20, the intermediate layer 30, the second information recording layer 40, and the substrate 50 will be detailed later by taking examples in terms of specific composition and other properties.

When viewed from the circumference of the optical information storage medium 200, the first information recording layer 20 (ROM layer) includes at least three memory areas: a first information storage area 20A, a fourth information storage area 20B, and a fifth information storage area 20C.

Meanwhile, the second information recording layer 40 (R layer/RE layer), when viewed from the circumference of the optical information storage medium 200, includes at least two memory areas: a second information storage area 40A and a third information storage area 40B.

The ROM layer may record information, for example, in the form of a row of prepits (indentations) formed on the interface between different materials. Accordingly, throughout the following, information may be described as being recorded on an "information storage surface" in the case of a ROM layer.

In contrast, in the case of an RE layer or an R layer, information may be described as being recorded in an "information storage area" throughout the following because the RE and R layers record information, for example, by altering a physical property of the information storage area in the in-plane direction of the information recording layers.

In short, an "information recording layer," as described in the foregoing, has either an information storage area or an information storage surface where information is stored and refers to a single layer or multiple layers of reflective film, storage film, or like film which has a particular storage-enabling property or to predetermined segments of a read-beam-hitting interface between two layers extending in the in-plane direction.

It would be troublesome if separate descriptions are given for the "information recording layer" when information is recorded on the "information storage surface" and when it is recorded in the "information storage area" as above. A description on the information recorded in the information storage area of an information recording layer is in general equally applicable to the information recorded on the information storage surface throughout the rest of the specification and claims.

The information may be stored either before or after the optical information storage medium 200 is shipped from a factory. In addition, the information may be written by the user either using or not using a backup/restoration system (coordination system) 1 and the optical disc device (information read/write device) 2 which will be detailed later.

In other words, the optical information storage medium 200 is a "hybrid optical information storage medium" containing a combination of ROM, RE, R, and/or other information recording layers with different storage-enabling properties.

Furthermore, "write-once" means that information can be read and written, but not erased.

Now, referring to the table in the bottom of FIG. 1, will be described information (data) recorded in the information storage areas provided in the information recording layers (the first and second information recording layers 20 and 40) of the optical information storage medium 200.

As illustrated in FIG. 1, the first information storage area 20A is an information storage area provided in the first information recording layer 20 and contains "fixed data:" an OS (operating system; first information, software), application software, and other various kinds of software (first information) and mpeg data (mpeg files; first information, content, movie data) and other various content (first information). The first information storage area 20A may contain an OS, various kinds of content, or many pieces of various kinds of software. For convenience, however, FIG. 1 only shows an OS being stored as an example.

"Software (first information)" refers to computer programs, or such combinations of instructions as to run a computer. The term has a very broad sense: examples vary vastly from the OS and like application software to spreadsheet and like application software.

"Content (first information)" refers to information that can be processed by the computer. The term has a very broad sense, including various information that can be processed by software: examples vary vastly from data collected in a database to images, movies, music, audio data, email or like text data, data published on a WEB page, photographs and a viewfinder startup screen for a camera, and broadcast content (1 seg, 3 seg, and terrestrial digital broadcast).

Examples of data formats and data compressions for the "content" include AAC (Advanced Audio Coding), WAV (standard audio data file format for Windows®; alternatively called WAVE files or WAVE sound files), and MP3 (MPEG-1 Audio Layer 3) for music files.

Data formats and data compressions for the movie "content" are, for example, Flash (animation creating software for Web sites from Macromedia), MP4 (MPEG-1 Audio Layer 4), and MPEG2 (movie and audio compression/decompression schemes standardized by ITU-T, or International Telecommunication Union Telecommunication Standardization Section, and ISO, or International Organization for Standardization; current MPEG schemes include MPEG 1 used for video CDs and other media, MPEG2 used for DVDs and other broadcast media, and MPEG4 for network distribution and mobile terminals) for video files.

Examples of communications schemes or communications protocols for the "content" include Bluetooth®, Felica, PLC (power line communication), WirelessLAN (wireless LAN, WLAN), IrDA (infrared wireless), IrSS (infrared wireless), and WCDMA (communications network).

The content may be broadcast by a TV (television) system which includes NTSC (national television system committee), PAL (phase alternation by line, SECAM (sequential couleur a memoire system), HD-MAC (high definition-multiple analogue component), and ATV (advanced television). Alternatively, the content may be broadcast by sound multiplex, stereo phonic sound multiplex, satellite communication based on broadcasting wave from a broadcasting satellite (BS) or a communication satellite (CS), cable television TV (CATV), extended definition television (EDTV), high definition television (HDTV), MUSE, 1 seg, 3 seg, and terrestrial digital broadcast.

For convenience in description, the OS is taken as an exemplary piece of software where necessary throughout the following. Also, MPEG2 (mpeg data) is taken as exemplary piece of content and may be described, although not accurate, simply as "mpeg data" or "mpeg."

The second information storage area 40A is an information storage area provided in the second information recording layer 40 and is available for writing information for use by various software (second information), such as OS update information (second information, update information) for OS security improvement and installation of the latest version and user settings information. Note that the optical information storage medium 200 primarily handles OS update information, whereas patent literature 1 simply handles, for example, various kinds of settings for the OS and applications.

The area 40A may also contain various additional information (second information) to be added to various content for use in effective utilization of mpeg data and like various content, various attached information (second information) attached to various content, and movie correction information (second information) for use in correction, moderation, modification, revision, comparison and alteration, and similar corrective manipulations for defects in images in various content and in security improvement for various content.

The area 40A may also contain information (second information) for use in implementation of plug-in functions with, for example, add-in software. A plug-in (add-in) is an addition of a new function to the standard functions of application software (first information). The second information storage area 40A may also be available for writing additional data (second information) for use by a database if the first information storage area 20A contains information representing a database (first information).

As detailed above, the optical information storage medium 200 is adapted so that the single medium can have the first information, either software or content, recorded in advance in the first information storage area 20A and the second information which will be written to the second information storage area 40A for use by the first information.

The first information may be made up either a single type or plural types of first information. The second information may be of plural types for one type of first information. An example would be different dates and times of creation or different dates and times of update (second information) for one type of first information.

Therefore, no separate backup storage medium needs to be prepared to record the second information. Physical and temporal separation of the first and second information is prevented as much as possible. Low cost backup is thus possible with less user time and workload.

Furthermore, since the user knows that the second information is written to the second information storage area 40A on the same medium, the user does not have to bother to reinstall the second information after searching for the recorded second information, unlike when the second information is written in a physically and temporally random manner.

In addition, if an arrangement is made so that the latest version of the second information is always stored, trouble in restoration becomes unnecessary. Reliable restoration is thus ensured including the reinstallation of the second information for use by the first information.

As detailed above, the software, the content, and the second information for use by the software and content can be readily backed up and restored with less user time and workload using the single optical information storage medium 200.

The third information storage area 40B is an information storage area provided in a "lead-in area" of the second information recording layer 40. The area 40B contains file management information for management of information (second information), such as OS update information written to the second information recording layer 40, on a file-to-file basis, as described in the following.

This configuration enables management of the OS update and other information written to the second information storage area 40A on a file-to-file basis according to the file management information. The OS update information that should be managed as a single file is therefore prevented from being recorded in duplication.

The configuration also enables management of all data manipulable on the PC (characters, numeric values, images, audio, programs, etc.) by placing them in files.

The fourth information storage area 20B is an information storage area provided in a lead-in area of the first information recording layer 20. The area 20B contains in advance a backup program for making a backup by writing the second information (e.g. OS update information) to the second information storage area 40A on the medium according to the file attribute information indicating file attributes in the file management information.

This configuration enables, for example, automatic execution of a backup, for example, when the optical information storage medium 200 is loaded into, for example, an optical disc device 2 as will be described below.

A "computer program" or "program" is such a combination of instructions as to run a computer. The term is inclusive of programs in any stage, may they be executable programs, intermediate code programs, or source code programs.

"To back up" or "to make a back up" is an act of storing an exact copy of original data in another storage device or medium in case of damage to the data due to system failure or other causes.

The fifth information storage area 20C is a memory area provided in the lead-in area of the first information recording layer 20. The area 20C contains in advance a restoration program for executing a restoration by storing the OS and other first information in a software data memory section (other storage medium, storage section) 401 in an optical-disc-device memory section (other storage medium, storage section) 4 or a hard disk (other storage medium, communications-device storage section) 32 and/or storing the OS update information and other second information in the optical-disc-device memory section 4 or the hard disk 32.

The configuration enables, for example, automatic execution of restoration, for example, when, for example, the optical information storage medium 200 is loaded into, for example, the backup/restoration system (coordination system) 1 which will be described below.

"Restoration" is an act of restoring original data from backed-up files and data.

Next, referring to FIGS. 2(a) to 2(d), the "file management information" will be described in detail.

The file management information contains the file attribute information indicating file attributes. The OS update information and like information (second information) is associated with the file attribute information.

The "file attribute information" is information, such as filename, size, date and time of creation, and date and time of update, given to a file.

FIG. 2(a) is a schematic diagram showing the attribute information in the file management information for the optical information storage medium 200; FIG. 2(b) is a schematic diagram showing an example of attribute information for a single file; FIG. 2(c) is a schematic diagram showing another example of the attribute information; and FIG. 2(d) is a schematic diagram showing another example of the attribute information.

As listed in FIG. 2(a), the file management information includes, among other examples, various attribute information indicated by symbols, FILE_NAME (file attribute information), FILE_ADR (file attribute information), FILE_TYPE (file attribute information), FILE_SIZE (file attribute information), and FILE_UPD (file attribute information).

FILE_NAME is a filename. The file is named, for example, OS update information.

FILE_ADR is physical address information for the file: for example, an address, "XX1 ... "

FILE_TYPE is information indicating a file type. Examples are OS and mpeg.

FILE_SIZE is information indicating a file size. An example is "YY1Y (megabytes)."

FILE_UPD is information indicating the date and time of creation or the date and time of update of the file. An example is "2008/12/11 18:00."

Using this file attribute information, one can, for example, manage plural files (that is, second information) by physically distinguishing between them based on, for example, the FILE_TYPE and FILE_NAME and by temporally distinguishing between them based on, for example, the FILE_UPD.

More specifically, the "file 1" described in FIG. 2(b) is identified by the FILE_TYPE and FILE_NAME as being information for use by the OS and by FILE_UPD as having a date and time of update of "2008/12/11 18:00".

Meanwhile, the "file 3" described in FIG. 2(d) is identified by the FILE_TYPE and FILE_NAME as being information for use by the OS and by FILE_UPD as having a date and time of update of "2008/12/12 11:05". The "file 1" and "file 3" are thus identified (distinguished from others) as being information for use by the same OS. Since the "file 3" has a later date and time of update than the "file 1," the "file 3" is identified (distinguished) as the latest OS update information for the OS.

In this manner, the latest second information can be identified even if there are plural sets of second information for use by a particular set of first information.

With this configuration, the present invention is applicable to a hybrid optical information storage medium, such as the optical information storage medium 200, giving extra storage capacity to the medium over a monolayer information storage medium.

As mentioned above, in the case of the optical information storage medium 200, the file management information for the OS update information is recorded in the third information storage area 40B when a backup is made. The present invention differs from patent literature 1 in this regard: the use of the file management information for making a backup of the OS update information.

2. More Specific Structure of Information Storage Medium

The optical information storage medium (information storage medium) 200 and an optical information storage medium (information storage medium) 201, embodying the information storage medium of the present invention, will be described in terms of their specific structure in reference to FIGS. 3 and 4.

The structure is the same as that described in 1. Structural Overview, Recorded Information, and Contents on Information Storage Medium, except for the description given in 2. More Specific Structure of Information Storage Medium. For convenience in description, the members that have the same function as those shown in figures in relation to 1. Structural Overview, Recorded Information, and Contents on Information Storage Medium are indicated by the same reference numerals and description thereof is omitted.

There is recent demand for "hybrid optical information storage media" in the field of multilayer optical information storage medium. A hybrid optical information storage media is an optical information storage medium with increased storage capacity which, besides an information recording layer where information is rewriteable, has an additional information recording layer, containing pre-recorded various content, which is either only readable repeatedly (read-only information recording layer) or writeable once. Hereinafter, the rewriteable information recording layer will be called the RE layer, the read-only information recording layer the ROM layer, and the write-once information recording layer the R layer.

The optical information storage media 200 and 201 described below are "hybrid optical information storage media." Each medium includes, on a substrate, recording layers, intermediate layers separating the recording layers, and a transparent layer provided farthest from the substrate. The recording layers are readable by a read beam. At least one of the recording layers is read-only (the read-only recording layer; hereinafter, the "ROM layer"). At least one of the remaining recording layers is rewriteable.

More specifically, the optical information storage medium 200 of the present embodiment, as illustrated in FIG. 3, contains a transparent layer 10, a first information recording layer (read-only layer, information recording layer) 20, an intermediate layer 30, a second information recording layer (write-once or rewriteable layer, information recording layer) 40, and a substrate 50, the layers and substrate being stacked in this order when the disc is viewed from the side hit by an incident read beam.

FIG. 3 is a schematic cross-sectional view of an exemplary structure for the optical information storage medium 200.

The transparent layer 10 is made of, for example, 75-μm thick ultraviolet-setting resin. The transparent layer 10 may be made of any material as long as it has high transmittance at the read beam wavelength. For example, the transparent layer 10 may be made of a polycarbonate film and a transparent adhesive. The transparent layer 10 may have on its surface a protective hard coating. The thickness of the transparent layer 10 may be altered according to the optical system used in the information read/write device for the optical information storage medium 200. Specifically, the transparent layer 10 may be, for example, a 0.6-mm polycarbonate substrate.

The first information recording layer 20 is a ROM layer and made of, for example, 15-nm thick aluminum nitride of which the refractive index is regulated through the nitrogen flow rate employed in the fabrication of the layer. The thickness and material for the first information recording layer 20 may be altered as long as the first information recording layer 20 has, for example, a reflectance in excess of 0.4% and less than or equal to 2.2% at the read beam wavelength.

In other words, the first information recording layer should be transparent to light at the read beam wavelength and have such a reflectance that a first read beam used to read the first information recording layer 20 can be focused and a second read beam used to read the second information recording layer 40 cannot be focused.

Specifically, the first information recording layer 20 may be made of, for example, silicon nitride, instead of aluminum nitride, or a dielectric primarily composed of aluminum nitride or silicon nitride. Another alternative is a multilayered structure.

The second read beam is emitted to the optical information storage medium 200 to read the second information recording layer 40 or another RE layer and can be produced even by, for example, the information read/write device that is compatible with optical information storage media manufactured under traditional industrial standards. The first read beam, having higher intensity than the second read beam, is emitted to the optical information storage medium 200 (or optical information storage medium 201 which will be described later) to read the first information recording layer 20. The first read beam can only produced by the information read/write device that is compatible with optical information storage media manufactured under new industrial standards.

The intermediate layer 30 is made of, for example, 25-μm thick transparent ultraviolet-setting resin. The intermediate layer 30 may be made of any material as long as it has high transmittance at the read beam wavelength. The thickness of the intermediate layer 30 may be altered as long as it can separate the recording layers (the first information recording layer 20 and the second information recording layer 40) sufficiently to suppress interlayer crosstalk.

Interlayer crosstalk is noise produced by the recording layers other than the one being read. Furthermore, the intermediate layer 30 may have a multilayered structure. The intermediate layer 30 is provided, on its surface facing the first information recording layer 20, with prepits (indentations; not shown) which represent information recorded in the form of geometry on the first information recording layer 20.

The second information recording layer 40 is an RE layer and as illustrated in FIG. 3, made of, for example, 7 stacked thin films. The 7 stacked thin films are, from the side hit by a read beam, a first protective film 41 (for example, 35-nm thick ZnS—SiO$_2$), a second protective film 42 (for example, 5-nm thick ZrO), a recording layer 43 (for example, 10-nm thick GeTe—Sb$_2$Te$_3$), a third protective film 44 (for example, 5-nm thick ZrO), a fourth protective film 45 (for example, 35-nm thick ZnS—SiO$_2$), a fifth protective film 46 (for example, 5-nm thick ZrO), and a reflective film 47 (for example, 20-nm thick APC (AgPdCu)).

The material and thickness of the second information recording layer 40, as well as the number of films constituting the layer 40, may be altered as long as the layer 40 functions as an RE layer.

The substrate 50 is made of, for example, 1.1-mm thick polycarbonate. The material, size, and thickness of the substrate 50 may be altered as long as the substrate 50 allows construction of a groove on its surface and has sufficient predetermined strength for use as the substrate. Specifically, the substrate 50 may be made of, for example, polyolefin resin or metal. Furthermore, the substrate 50 may have a multilayered structure.

In addition to the groove, the substrate 50 may be provided, on its surface, with prepits (indentations) which represent information recorded in the form of geometry on the second information recording layer 40. When this is the case, the region of the second information recording layer 40 in which the prepits are provided is read-only. To put differently, the second information recording layer 40 may include an RE region and a ROM region. For the sake of practising the present invention, the ROM region is preferably as small in size as possible when compared with the RE region.

Figure 4:
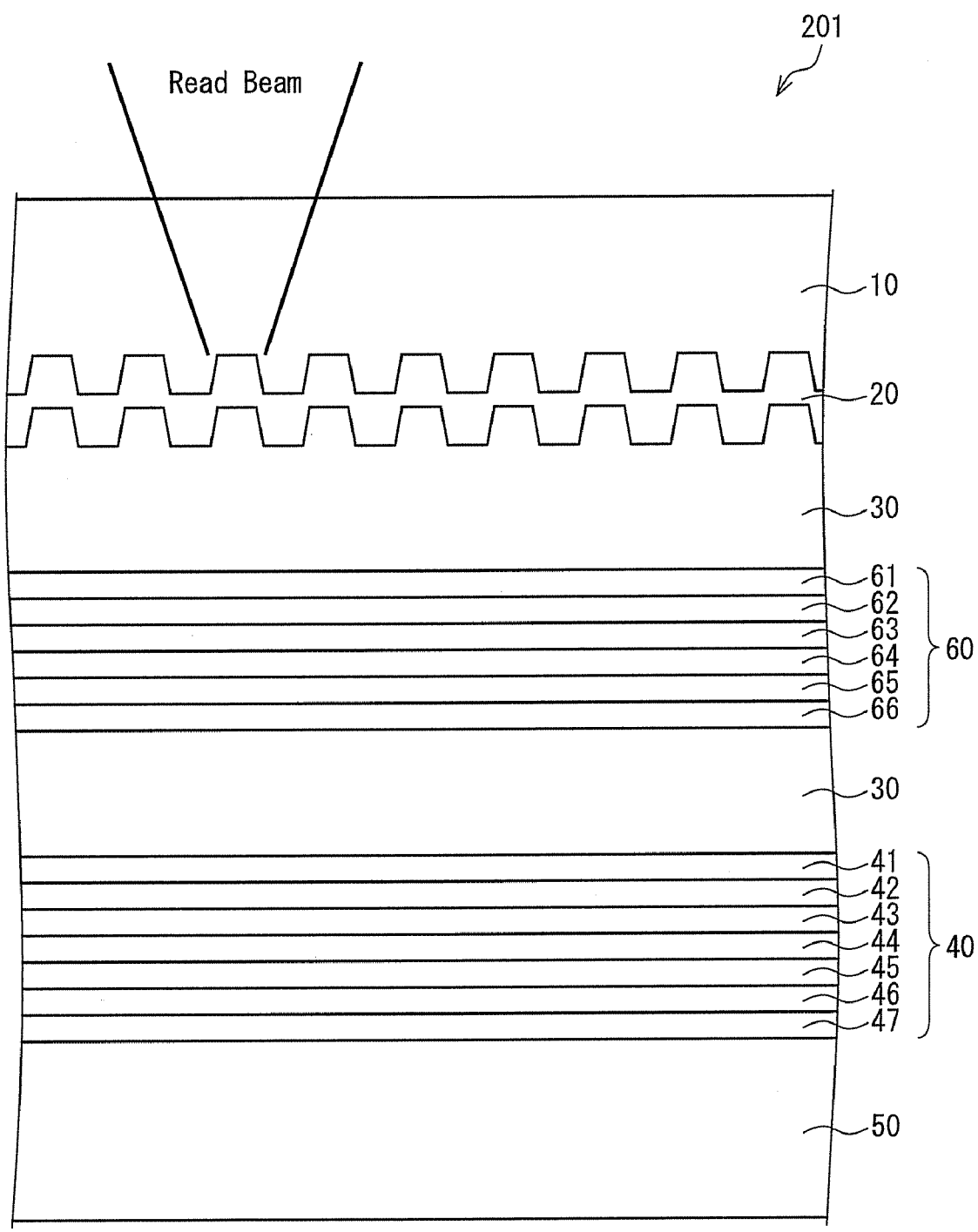
FIG. 4 is a schematic illustration showing a structure of an information storage medium according to another embodiment of the present invention.

Next, the optical information storage medium 201, another example of the present embodiment, as illustrated in FIG. 4, contains a transparent layer 10, a first information recording layer 20, an intermediate layer 30, a third information recording layer (recordable layer, information recording layer) 60, another intermediate layer 30, a second information recording layer 40, and a substrate 50, the layers and substrate being stacked in this order when the disc is viewed from the side hit by an incident read beam. FIG. 4 is a schematic cross-sectional view of an exemplary structure for the optical information storage medium 201.

The transparent layer 10 is made of, for example, 50-μm thick ultraviolet-setting resin. The transparent layer 10 may be made of any material as long as it has high transmittance at the read beam wavelength. For example, the transparent layer 10 may be made of a polycarbonate film and a transparent adhesive. The transparent layer 10 may have on its surface a protective hard coating. The thickness of the transparent layer 10 may be altered according to the optical system used in the information read/write device for the optical information storage medium 201. Specifically, the transparent layer 10 may be, for example, a 0.6 mm polycarbonate substrate. The first information recording layer 20 is a ROM layer made of, for example, 15-nm thick aluminum nitride of which the refractive index is regulated through the nitrogen flow rate employed in the fabrication of the layer.

The thickness and material for the first information recording layer 20 may be altered as long as the first information recording layer 20 has, for example, a reflectance in excess of 0.4% and less than or equal to 2.2% at the read beam wavelength. In other words, the first information recording layer 20 should be transparent to light at the read beam wavelength and have such a reflectance that a second read beam cannot be focused to read the second information recording layer 40 or the third information recording layer 60 and a first read beam can be focused to read the first information recording layer 20.

Specifically, the first information recording layer 20 may be made of, for example, silicon nitride, instead of aluminum nitride, or a dielectric primarily composed of aluminum nitride or silicon nitride. Another alternative is a multilayered structure.

Each intermediate layer 30 is made of, for example, 25-μm thick transparent ultraviolet-setting resin. The intermediate layer 30 may be made of any material as long as it has high transmittance at the read beam wavelength. The thickness of the intermediate layer 30 may be altered as long as it can separate the recording layers (the first information recording layer 20, the second information recording layer 40, and the third information recording layer 60) sufficiently to suppress interlayer crosstalk. Furthermore, the intermediate layer 30 may have a multilayered structure.

One of the intermediate layers 30 that is disposed between the first information recording layer 20 and the third information recording layer 60 is provided, on its surface facing the first information recording layer 20, with prepits (indentations) which represent information recorded in the form of geometry on the first information recording layer 20.

The other intermediate layer 30, disposed between the second information recording layer 40 and the third information recording layer 60, is provided, on its surface facing the third information recording layer 60, with a groove. The intermediate layer 30 may be provided with a groove and prepits (indentations) which represent information recorded in the form of geometry on the third information recording layer 60. When this is the case, the region of the third information recording layer 60 in which the prepits are provided is read-only. To put differently, the third information recording layer 60 may include an RE region and a ROM region.

For the sake of practising the present invention, the ROM region is preferably as small in size as possible when compared with the RE region.

The second information recording layer 40 is an RE layer and made of, for example, 7 stacked thin films. The 7 stacked thin films are, from the side hit by a read beam, a first protective film 41 (for example, 35-nm thick ZnS—SiO$_2$), a second protective film 42 (for example, 5-nm thick ZrO), a recording layer 43 (for example, 10-nm thick GeTe—Sb$_2$Te$_3$), a third protective film 44 (for example, 5-nm thick ZrO), a fourth protective film 45 (for example, 35-nm thick ZnS—SiO$_2$), a fifth protective film 46 (for example, 5-nm thick ZrO), and a reflective film 47 (for example, 20-nm thick APC (AgPdCu)).

The material and thickness of the second information recording layer 40, as well as the number of films constituting the layer 40, may be altered as long as the layer 40 functions as an RE layer.

The third information recording layer 60 is an RE layer and made of, for example, 6 stacked thin films The 6 stacked thin films are, from the side hit by a read beam, a first protective film 61 (for example, 35-nm thick ZnS—SiO$_2$), a second protective film 62 (for example, 5-nm thick ZrO), a recording layer 63 (for example, 6-nm thick GeTe—Sb$_2$Te$_3$), a third protective film 64 (for example, 5-nm thick ZrO), a translucent film 65 (for example, 20-nm thick APC (AgPdCu)), and a transmittance regulatory film 66 (for example, 19-nm thick TiO$_2$).

The material and thickness of the third information recording layer 60, as well as the number of films constituting the layer 60, may be altered as long as the layer 60 functions as an RE layer having a transmittance of about 60% at the read beam wavelength.

The substrate 50 is made of, for example, 1.1-mm thick polycarbonate. The material, size, and thickness of the substrate 50 may be altered as long as the substrate 50 allows construction of a groove on its surface and has sufficient predetermined strength for use as the substrate. Specifically, the substrate 50 may be made of, for example, polyolefin resin or metal. Furthermore, the substrate 50 may have a multilayered structure.

In addition to the groove, the substrate 50 may be provided, on its surface, with prepits (indentations) which represent information recorded in the form of geometry on the second information recording layer 40. When this is the case, the region of the second information recording layer 40 in which the prepits are provided is read-only. To put differently, the second information recording layer 40 may include an RE region and a ROM region.

For the sake of practising the present invention, the ROM region is preferably as small in size as possible when compared with the RE region.

The optical information storage medium 201 is not limited to the aforementioned structure. One of the RE layers may be replaced by an R layer.

The optical information storage medium 200 and the optical information storage medium 201 are not limited to 2-layer or 3-layer structure. There may be provided an additional recording layer in the optical information storage medium.

The first information recording layer 20 in the optical information storage medium 200 (and the optical information storage medium 201) is preferably made of a dielectric of which the refractive index is in excess of 1.75 and less than or equal to 2.06.

The optical information storage medium 201 has substantially the same structure as the optical information storage medium 200, except for the addition of the third information recording layer 60 and the intermediate layer 30.

The addition of the single third information recording layer 60 has at least doubled the storage capacity for the aforementioned OS update information and other second information.

This multiplication of the information recording layer enables the information storage medium of the present invention to have increased storage capacity.

As mentioned above, the optical information storage medium 200 and the optical information storage medium 201 are hybrid optical information storage media provided with a ROM area and either an RE or R area. The present invention differs in this regard from patent literature 1 in which the information storage medium is a HDD that consists of an RE area.

3. Structure of Coordination System

Figure 5:
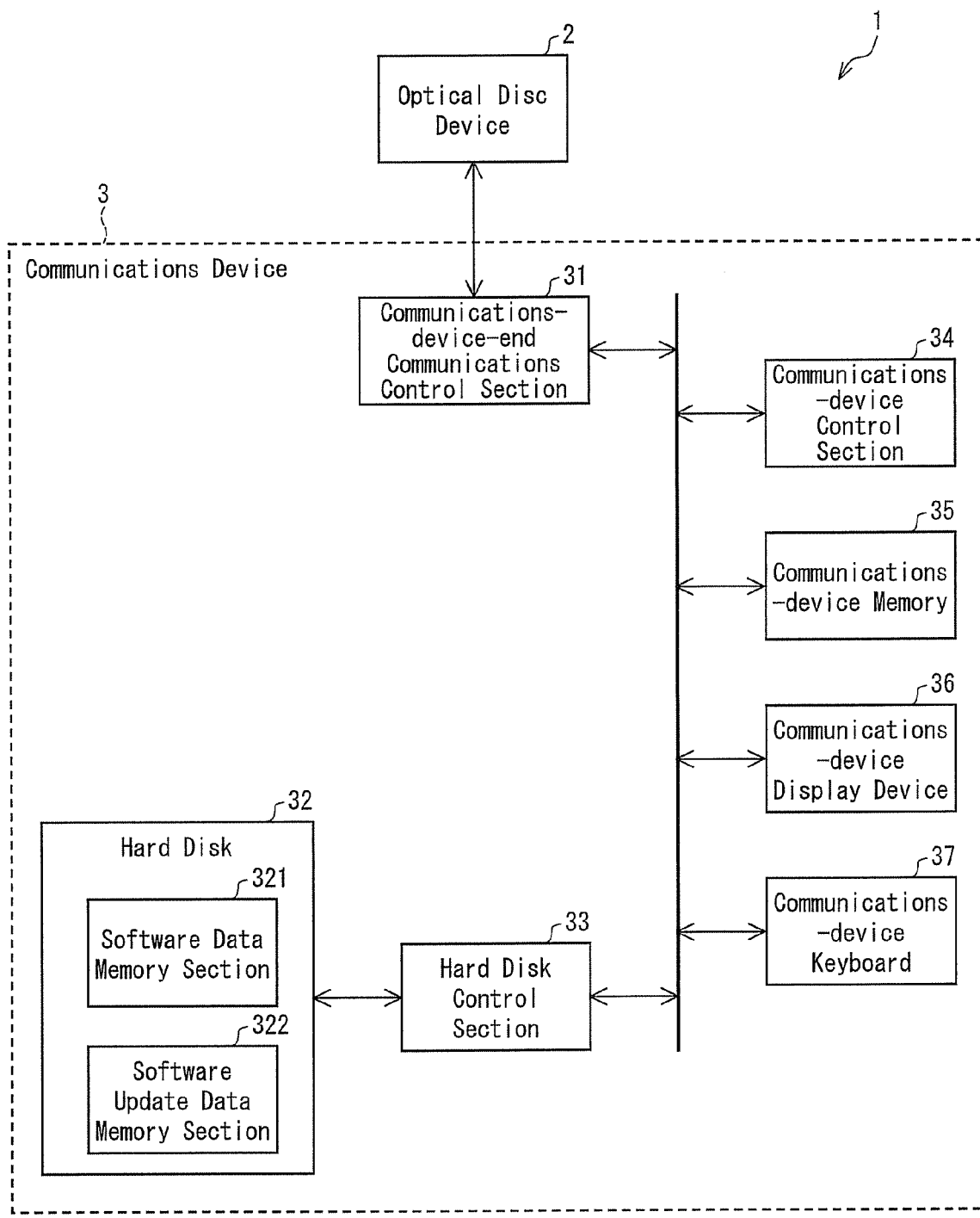
FIG. 5 is a block diagram showing the structure of a coordination system according to an embodiment of the present invention.
Figure 6:
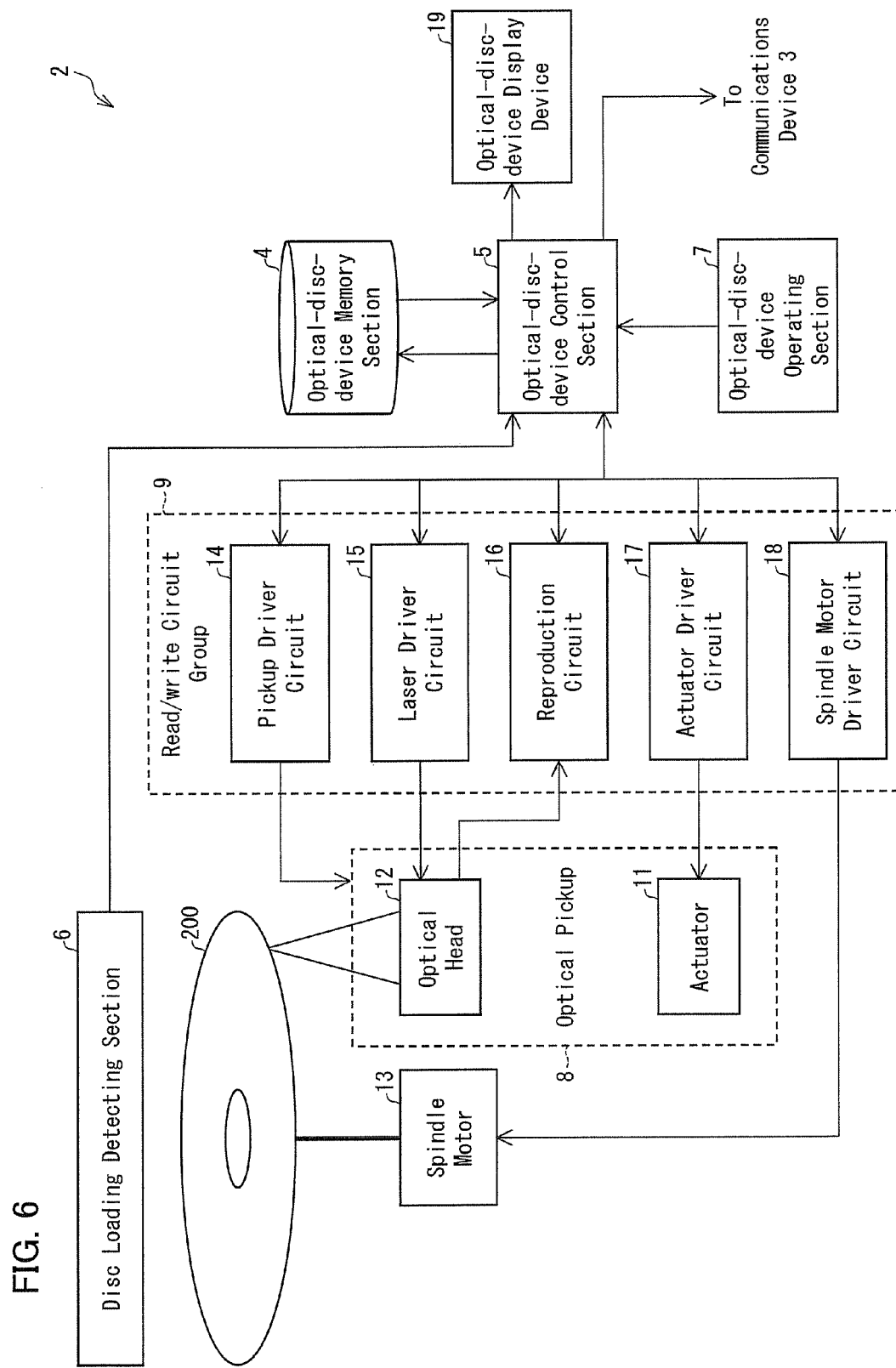
FIG. 6 is a block diagram showing the structure of an information read/write device according to an embodiment of the present invention.
Figure 7:
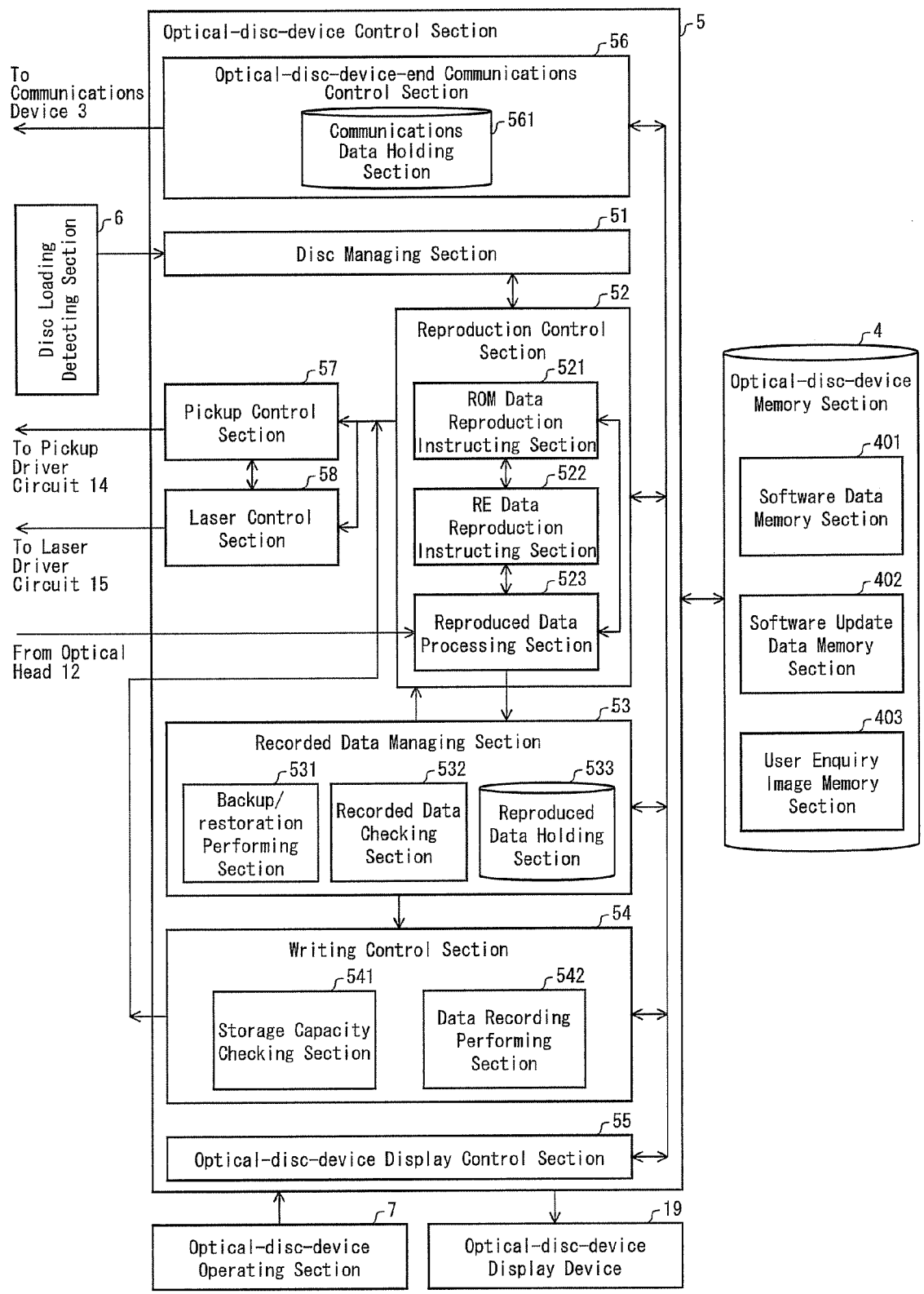
FIG. 7 is a block diagram showing the structure of major components of the information read/write device.

Referring to FIGS. 5 to 7, will be described the structure of the backup/restoration system (coordination system) 1 which is an embodiment of the present invention.

The structure is the same as that described in 1. Structural Overview, Recorded Information, and Contents on Information Storage Medium and 2. More Specific Structure of Information Storage Medium, except for the description given in 3. Structure of Coordination System. For convenience in description, the members that have the same function as those shown in figures in relation to 1. Structural Overview, Recorded Information, and Contents on Information Storage Medium and 2. More Specific Structure of Information Storage Medium are indicated by the same reference numerals and description thereof is omitted. Similar descriptions will omitted to for the sake of simplicity throughout the following.

FIG. 5 is a block diagram showing the structure of the backup/restoration system 1 in detail.

As illustrated in FIG. 5, the backup/restoration system 1 is a coordination system for the optical disc device (information read/write device) 2 and the communications device (information communications device) 3.

The optical disc device 2 is communicatively connected to the communications device 3. "Communications" here may be either wired or wireless.

The structure of the optical disc device 2 will be detailed later. The specific structure of the communications device 3 is first described.

The communications device 3, as illustrated in FIG. 5, includes a communications-device-end communications control section (reception control means) 31, a hard disk (other storage medium, communications-device storage section) 32, a hard disk control section (writing control means, first information recording verification means, second information recording verification means) 33, a communications-device control section 34, a communications-device memory 35, a communications-device display device 36, and a communications-device keyboard 37.

The communications-device-end communications control section 31 primarily receives information from the optical disc device 2, transmits information to the optical disc device 2, and transmits information to the hard disk control section (writing control section) 33.

More specifically, the section 31 primarily controls to exchange, between the optical disc device 2 and the hard disk control section 33, the OS, application software, and other various software (first information), mpeg data and other various content (first information), the OS update information (second information) and movie correction information (second information) for use by this software and content, and commands, instructions, notifications, enquiries, and other information for information processing.

The hard disk control section (writing control means, first information recording verification means, second information recording verification means) 33 controls to check if the hard disk 32 contains the OS, application software, and other various software, the mpeg data and other various content, and the OS update information and movie correction information for use by this software and contents. If it is confirmed that the hard disk 32 contains the OS, application software, and other various software, the mpeg data and other various content, and the OS update information and movie correction information for use by this software and contents, the section 33 controls to notify the communications-device-end communications control section 31 of the successful verification and to store information received from the communications-device-end communications control section 31 in the hard disk 32.

The communications-device control section 34 is the "CPU (central processing unit)" for the communications device 3, controlling overall operation of the communications device 3. The communications-device memory 35 temporarily holds various information. The communications-device display device 36 produces a display from image data.

The communications-device memory 35 temporarily holds various information in the communications device 3.

The communications-device display device 36 displays movie and other content read from the hard disk 32.

The communications-device keyboard 37 receives user instructions to the communications device 3.

The hard disk 32 stores information and has at least two memory areas: a software data memory area 321 and a software update data memory area 322.

The software data memory section 321 is a storage area primarily containing the OS and other software (first information) received by the communications-device-end communications control section 31 from the optical disc device 2 and also containing information on this OS and software in advance.

The software update data memory area 322 is a storage area primarily containing the OS update information (second information) received by the communications-device-end communications control section 31 from the optical disc device 2 and also containing information on the OS update information in advance.

Next, referring to FIGS. 6 and 7, will be described the structure of the optical disc device (information read/write device) 2 which is an embodiment of the present invention.

FIG. 6 is a schematic block diagram showing the structure of an embodiment of the optical disc device 2.

The optical disc device 2, as illustrated in FIG. 6, includes, as major components, an optical-disc-device memory section (other storage medium, storage section) 4, an optical-disc-device control section 5, a disc loading detecting section 6, an optical-disc-device operating section 7, an optical pickup 8, a read/write circuit group 9, a spindle motor 13, and an optical-disc-device display device 19.

The optical pickup 8 includes an actuator 11 and an optical head 12.

The read/write circuit group 9 includes a pickup driver circuit 14, a laser driver circuit 15, a reproduction circuit 16, an actuator driver circuit 17, and a spindle motor driver circuit 18.

The optical disc device 2 writes and reads information on an optical information storage medium (e.g. the optical information storage medium 200, the optical information storage medium 201, any DVD and BD). The optical information storage medium 200 will be used below.

As illustrated in FIG. 6, in the optical disc device 2, the actuator 11 (optical pickup 8) driven by the actuator driver circuit 17 moves closer to the optical information storage medium 200 being rotated by the spindle motor 13 driven by the spindle motor driver circuit 18. Furthermore, the pickup driver circuit 14 places the optical pickup 8 above a track (not shown) on the optical information storage medium 200.

The optical-disc-device control section 5 specifies writing conditions through the laser driver circuit 15 and controls the optical head 12 to emit a write laser beam onto a writing site on the optical information storage medium 200, to write information to the track of the optical information storage medium 200.

Subsequently, in the optical disc device 2, the optical-disc-device control section 5 controls the actuator driver circuit 17 to move the actuator 11 to near the optical information storage medium 200 and controls the pickup driver circuit 14 to move the optical pickup 8 above the writing site on the optical information storage medium 200. The optical-disc-device control section 5 then controls the laser driver circuit 15 to emit a read laser beam from the optical head 12 onto the optical information storage medium 200.

Next, the reflection detected by the optical head 12 is converted to a reproduction signal in the reproduction circuit 16 for output to the optical-disc-device control section 5. Accordingly, the optical disc device 2 can reproduce the information stored in the track of the optical information storage medium 200.

In addition, the optical disc device 2 is provided with the disc loading detecting section 6. The disc loading detecting section 6 detects loading of an optical information storage medium 200. The section 6 may be, for example, one of various kinds of sensors. Any sensor may be used as long as it can detect loading of the optical information storage medium 200.

The disc loading detecting section 6 outputs a result of the detection as a detection signal to the optical-disc-device control section 5.

The optical-disc-device operating section 7 allows a user to input various manipulation commands to the optical disc device 2 and may be, for example, operation buttons and their interface.

The reproduced information (first information, second information, update information, file management information, etc.) output from the reproduction circuit 16 is temporarily or permanently stored in the optical-disc-device memory section 4.

The optical-disc-device display device 19 produces a display from, for example, image data obtained by reading the mpeg data stored in the optical-disc-device memory section 4.

Next, referring to FIG. 7, major components (e.g., the optical-disc-device control section 5) of the optical disc device 2 will be described in detail. FIG. 7 a block diagram showing the structure of major components of the optical disc device 2.

As illustrated in FIG. 7, the optical-disc-device control section 5 in the optical disc device 2 includes a disc managing section 51, a reproduction control section 52, a recorded data managing section (first information verification means, second information verification means) 53, a writing control section (writing control means) 54, an optical-disc-device display control section 55, an optical-disc-device-end communications control section (transmission control means) 56, a pickup control section 57, and a laser control section 58.

The reproduction control section 52 includes a ROM data reproduction instructing section 521, an RE data reproduction instructing section 522, and a reproduced data processing section 523.

The recorded data managing section 53 includes a backup/restoration performing section 531, a recorded data checking section (first information verification means, second information verification means) 532, and a reproduced data holding section 533.

The writing control section 54 includes a storage capacity checking section 541 and a data recording performing section 542.

The optical-disc-device-end communications control section 56 includes a communications data holding section 561.

Now, each element mentioned above will be described.

The disc managing section 51 receives a detection signal indicating that the disc loading detecting section 6 has detected an information storage medium (e.g. the optical information storage medium 200) being loaded into the optical disc device 2 and transmits an operation instruction to, for example, the reproduction control section 52. The section 51 also performs other processes.

The reproduction control section 52 instructs the pickup control section 57, the laser control section 58, etc. to drive the read/write circuit group 9 to reproduce information stored on the optical information storage medium 200.

The ROM data reproduction instructing section 521 instructs the pickup control section 57, the laser control section 58, etc. to read software, content, etc. from the first information recording layer 20 (ROM layer) of the optical information storage medium 200. The following description will assume for convenience that the first information recording layer 20 of the optical information storage medium 200 contains a particular OS.

The RE data reproduction instructing section 522 instructs the pickup control section 57, the laser control section 58, etc. to read, for example, file management information and OS update information from the second information recording layer 40 (R layer/RE layer) of the optical information storage medium 200.

The reproduced data processing section 523 receives from the optical head 12 via the reproduction circuit 16 and transmits to the recorded data managing section 53, the OS, file management information, OS update information, backup processing program, restoration program, etc. (hereinafter, collectively called "reproduced information") destined for the optical-disc-device control section 5. The section 523 also performs other processes on reproduced information.

The recorded data managing section 53 causes the backup/restoration performing section 531 to execute a backup program and a restoration program transmitted from the reproduced data processing section 523, causes the recorded data checking section 532 to check if the optical information storage medium 200, the optical-disc-device memory section 4, and the hard disk contain an OS, OS update information, etc., and causes the reproduced data holding section 533 to temporarily or permanently hold the reproduced information transmitted from the reproduced data processing section 523.

The backup/restoration performing section 531 instructs to start and exit the backup program and the restoration program transmitted from the reproduced data processing section 523. The section 531 also instructs for execution or exit from other programs, as well as other program related processes.

The recorded data checking section 532 checks if the optical-disc-device memory section 4 contains an OS, OS update information, etc. and enquires of the hard disk control section 33, via the optical-disc-device-end communications control section 56 and the communications-device-end communications control section 31, if the hard disk 32 contains an OS, OS update information, etc.

The reproduced data holding section 533 temporarily holds the reproduced information transmitted from the reproduced data processing section 523.

The writing control section 54 controls the storage capacity checking section 541 to check the storage capacity of the second information storage area 40A of the optical information storage medium 200 or the optical-disc-device memory section 4, enquires of the hard disk control section 33, via the optical-disc-device-end communications control section 56 and the communications-device-end communications control section 31, about the storage capacity of the hard disk 32, and instructs the data recording performing section 542 to record the OS, OS update information, etc. to the optical information storage medium 200, the optical-disc-device memory section 4, and the hard disk 32. The section 54 also controls other processes.

The storage capacity checking section 541 checks the storage capacity of the second information storage area 40A of the optical information storage medium 200 or the optical-disc-device memory section 4 and enquires of the hard disk control section 33, via the optical-disc-device-end communications control section 56 and the communications-device-end communications control section 31, about the storage capacity of the hard disk 32.

The data recording performing section 542 writes OS update information (latest version) to the optical information storage medium 200 by, for example, driving the pickup driver circuit 14 via the pickup control section 57 and driving the laser driver circuit 15 via the laser control section 58 (driving the read/write circuit group 9), conversely writes the OS, OS update information, etc. stored in the optical information storage medium 200 to the optical-disc-device memory section 4, and transmits the OS, OS update information, etc. via the optical-disc-device-end communications control section 56 and the communications-device-end communications control section 31 so that the hard disk control section 33 can control the hard disk 32 to record the transmitted OS, OS update information, etc.

The optical-disc-device display control section 55 controls to read a user enquiry image from a user enquiry image memory section 403 in the optical-disc-device memory section 4 to have it displayed on the optical-disc-device display device 19.

The optical-disc-device-end communications control section 56, in cooperation with the communications-device-end communications control section 31, controls communications between the optical disc device 2 and the communications device 3.

The communications data holding section 561 temporarily holds the OS, OS update information, and other information to be transmitted to the communications device 3 and temporarily holds the OS, OS update information, and other information transmitted from the communications device 3.

4. Major Operation of Coordination System

Now, referring to FIG. 7. The major operation of the backup/restoration system 1 will be described.

First will be described a case where the optical disc device 2 performs a backup process within the device 2. In the optical disc device 2, the recorded data checking section 532 shown in FIG. 7 checks if the software update data memory section 402 in the optical-disc-device memory section 4 contains OS update information. If it is confirmed by the recorded data checking section 532 that the software update data memory section 402 in the optical-disc-device memory section 4 contains OS update information, the data recording performing section 542 writes the OS update information to the second information storage area 40A of the optical information storage medium 200.

Assume throughout the following description that the backup/restoration system 1 is connected, for example, to the Internet (not shown) so that the system 1 can receive the latest OS update information from a predetermined server and record the latest OS update information in the software update data memory section 402 in the optical-disc-device memory section 4 when necessary.

The OS update information is read from the software update data memory section 402 and written to the second information storage area 40A of the optical information storage medium 200 if the OS update information stored in the software update data memory section 402 turns out to be the latest version in a comparison between the FILE_UPD (file attribute information) for the OS update information written to the third information storage area 40B of the optical information storage medium 200 and the FILE_UPD for the OS update information stored in the software update data memory section 402 in the optical-disc-device memory section 4 (differential backup).

Accordingly, the OS update information (latest version) stored in the software update data memory section 402 is written to the second information storage area 40A of the optical information storage medium 200 for backup.

In addition, unnecessary backup is not carried out since the backup is done only if it is confirmed that the software update data memory section 402 stores the OS update information (latest version) when the optical disc device 2 carries out the process on its own.

As mentioned above, the backup/restoration system avoids making a duplicate backup of the same OS update information by referring to the file attribute information. The present invention differs from patent literature 1 in this regard.

Next will be described a case where the optical disc device 2 and the communications device 3 cooperate as the backup/restoration system 1 to make a backup. The recorded data checking section 532 in the optical disc device 2 instructs the hard disk control section 33 via the optical-disc-device-end communications control section 56 and the communications-device-end communications control section 31 to check if the hard disk 32 contains the OS update information (latest version). If the hard disk control section 33 has confirmed that the hard disk contains the OS update information, the communications-device-end communications control section 31 in the communications device 3 reads the OS update information from the software update data memory area 322 of the hard disk 32 via the hard disk control section 33, for transmission to the optical disc device 2.

The OS update information is read from the software update data memory area 322 and transmitted to the optical disc device 2 if a comparison between the FILE_UPD (file attribute information) for the OS update information written to the third information storage area 40B of the optical information storage medium 200 and the FILE_UPD for the OS update information stored in the hard disk 32 has revealed that the OS update information stored in the hard disk 32 is the latest version (differential backup).

Accordingly, the communications-device-end communications control section 31 transmits the OS update information to the optical disc device 2 only when the hard disk control section 33 has confirmed that the hard disk 32 contains the OS update information. Unnecessary transmission of the OS update information is thus prevented.

The optical-disc-device-end communications control section 56 in the optical disc device 2 receives the OS update information transmitted from the communications-device-end communications control section 31.

The data recording performing section 542 in the optical disc device 2 writes the OS update information received by the optical-disc-device-end communications control section 56 to the second information storage area 40A of the optical information storage medium 200.

A copy of the OS update information is thus made in the second information storage area 40A of the optical information storage medium 200 as a backup from the hard disk 32 in the communications device 3 which is connected communicatively to the optical disc device 2.

The data recording performing section 542 in the optical disc device 2 may be standing by before the backup, with a display on the optical-disc-device display device 19 asking for a user permission, so that the section 542 can write the OS update information in response to a user input (backup permission) via the optical-disc-device operating section 7.

In addition, the data recording performing section 542 may monitor the life of the optical-disc-device memory section 4 and the hard disk 32 so that the aforementioned operation can be controlled based on the monitoring for backup.

Next will be described a case where the optical disc device 2 performs a restoration process within the device 2. In the optical disc device 2, the recorded data checking section 532 checks if the software data memory section 401 in the optical-disc-device memory section 4 in the optical disc device 2 contains an OS. The recorded data checking section 532 also checks if the software update data memory section 402 in the optical-disc-device memory section 4 in the optical disc device 2 contains OS update information.

If the recorded data checking section 532 has confirmed that the software data memory section 401 in the optical-disc-device memory section 4 contains no OS, the data recording performing section 542 stores the OS in the software data memory section 401 in the optical-disc-device memory section 4. On the other hand, if the recorded data checking section 532 has confirmed that the software update data memory section 402 in the optical-disc-device memory section 4 contains no OS update information, the section 542 stores the OS update information in the software update data memory section 402 in the optical-disc-device memory section 4.

The optical disc device 2 can thus perform a restoration by storing the OS stored in the first information storage area 20A of the optical information storage medium 200 or the OS update information written in the second information storage area 40A of the optical information storage medium 200 to the optical-disc-device memory section 4 of the optical disc device 2.

In addition, unnecessary restoration is prevented since the restoration is done only if the recorded data checking section 532 has confirmed that the optical-disc-device memory section 4 of the optical disc device 2 contains no OS or only if the recorded data checking section 532 has confirmed that the optical-disc-device memory section 4 of the optical disc device 2 contains no OS update information.

Next will be described a case where the optical disc device 2 and the communications device 3 cooperate as the backup/restoration system 1 to perform a restoration. The recorded data checking section 532 instructs the hard disk control section 33 via the optical-disc-device-end communications control section 56 and the communications-device-end communications control section 31 to check if the hard disk 32 contains an OS. If the hard disk control section 33 has confirmed that the hard disk 32 contains no OS, the communications-device-end communications control section 31 reads the OS from the first information storage area 20A of the optical information storage medium 200 for transmission to communications device 3.

The recorded data checking section 532 also instructs the hard disk control section 33 via the optical-disc-device-end communications control section 56 and the communications-device-end communications control section 31 to check if the hard disk 32 contains OS update information. If the hard disk control section 33 has confirmed that the hard disk 32 contains no OS update information, the optical-disc-device-end communications control section 56 reads the OS from the second information storage area 40A of the optical information storage medium 200 for transmission to the communications device 3.

In this manner, the optical-disc-device-end communications control section 56 transmits the OS or the OS update information to the communications device 3 only if the hard disk control section 33 has confirmed that the hard disk 32 contains no OS or only if the hard disk control section 33 has confirmed that the hard disk 32 contains no OS update information. Unnecessary transmission of the OS or the OS update information is thus prevented.

The communications-device-end communications control section 31 in the communications device 3 receives the OS or the OS update information from the optical disc device 2.

The hard disk control section 33 in the communications device 3 stores the OS received by the communications-device-end communications control section 31 in the hard disk 32 in the communications device 3 or the OS update information received by the communications-device-end communications control section 31 to the hard disk 32 in the communications device 3.

A restoration of the OS or the OS update information is thus performed by storing from the first information storage area 20A of the optical information storage medium 200 or the second information storage area 40A in the hard disk 32 in the communications device 3 which is connected communicatively to the optical disc device 2.

The data recording performing section 542 in the optical disc device 2 may be standing by before the restoration, with a display on the optical-disc-device display device 19 asking for a user permission, so that the section 542 can perform the operation in response to a user input (restoration permission) via the optical-disc-device operating section 7.

5. Operation of Coordination System in Detail

Figure 8:
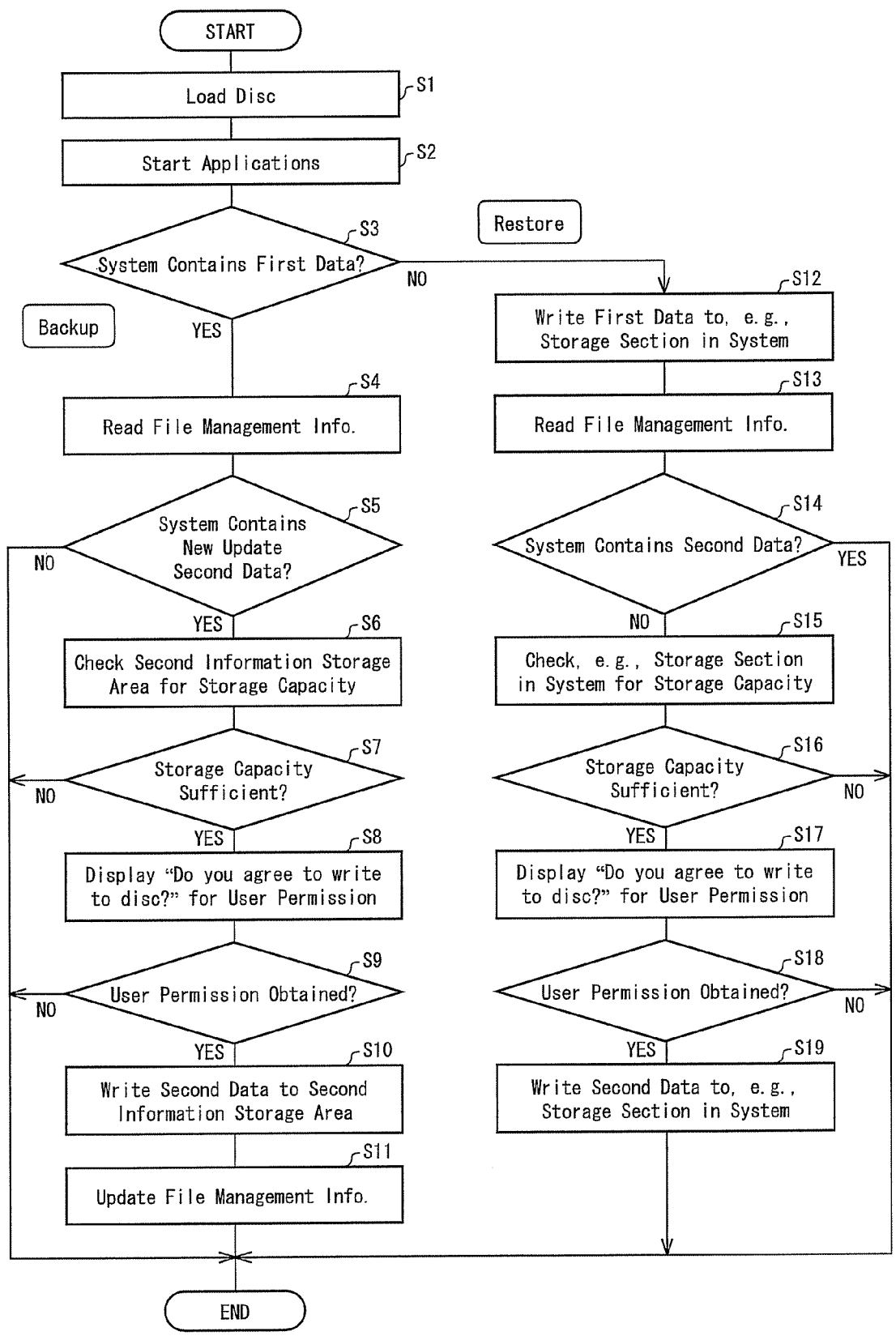
FIG. 8 is a flow chart depicting the operation of the coordination system.

Next, the operation will be described in detail in reference to the flow chart shown in FIG. 8.

First, The power supply for the optical disc device 2 and the communications device 3 is turned on to activate the backup/restoration system 1 ("START").

Backup Flow (with Some Relevant Description)

In step S1 (hereinafter, "step" is omitted), the optical information storage medium 200 is inserted (loaded) into a predetermined medium holder (not shown) in the optical disc device 2. The operation then moves to S2.

In S2, the disc loading detecting section 6 detects that the optical information storage medium 200 has been loaded and transmits the detection result (detection signal) to the disc managing section 51.

The disc managing section 51 receives the detection result and reads a disc ID (normally recorded on the side of the optical information storage medium 200 which is hit by a read beam, closer to the center of the medium 200 than the far back, for example, closer to the center than the third information storage area 40B) to identify the disc structure of the optical information storage medium 200. The section 51 then issues an operation instruction to the ROM data reproduction instructing section 521 in the reproduction control section 52.

The ROM data reproduction instructing section 521 receives the operation instruction and controls the optical pickup 8, the spindle motor 13, etc. via the read/write circuit group 9 to reproduce a backup program from the fourth information storage area 20B of the optical information storage medium 200 and a restoration program from the fifth information storage area 20C.

The reproduced data processing section 523 receives reproduced information for the reproduced backup and restoration programs via the reproduction circuit 16, records the information in the reproduced data holding section 533, and notifies the backup/restoration performing section 531 of it.

The backup/restoration performing section 531 reads and starts the backup and restoration programs from the reproduced data holding section 533. The operation then moves to S3.

The following will describe a backup process and a restoration process as being associated with each other to some extent, but selectively executable. Alternatively, the backup/restoration system 1 may be configured so as not to associate the processes so that they can independently executable.

In S3, according to the backup and restoration programs, the recorded data managing section 53 checks if the software data memory section 401 in the optical-disc-device memory section 4 contains the same OS as does the first information storage area 20A of the optical information storage medium 200.

In so doing, the recorded data managing section 53 instructs the hard disk control section 33 via the optical-disc-device-end communications control section 56 and the communications-device-end communications control section 31 to check if the software update data memory area 322 of the hard disk 32 contains the same OS as does the first information storage area 20A of the optical information storage medium 200.

If either the software data memory section 401 in the optical-disc-device memory section 4 or the software update data memory area 322 of the hard disk 32 contains the same OS as does the first information storage area 20A of the optical information storage medium 200 ("YES"), the restoration program is exited. The operation then moves to S4.

On the other hand, if neither the software data memory section 401 in the optical-disc-device memory section 4 nor the software update data memory area 322 of the hard disk 32 contains the same OS as does the first information storage area 20A of the optical information storage medium 200 ("NO"), the backup program is exited. The operation then moves to S12.

In S4, according to the backup program, the RE data reproduction instructing section 522 in the reproduction control section 52 reads the third information storage area 40B of the optical information storage medium 200 via the read/write circuit group 9 for file management information. The file management information readout is transmitted to the reproduced data processing section 523 via the reproduction circuit 16. The reproduced data processing section 523 causes the reproduced data holding section 533 to temporarily hold the file management information readout. The operation then moves to S5.

In S5, according to the backup program, the recorded data checking section 532 in the recorded data managing section 53 compares the FILE_NAME in the file management information with the FILE_NAME for the OS update information stored in the software update data memory section 402 in the optical-disc-device memory section 4, to check if the software update data memory section 402 contains OS update information corresponding to the OS (update information corresponding to the OS stored in the first information storage area 20A; the same terminology applies throughout the following description).

If the software update data memory section 402 contains OS update information corresponding to the OS, the recorded data checking section 532 also checks if the OS update information in the software update data memory section 402 is the latest version (more up-to-date than the OS update information in the optical information storage medium 200) by comparing FILE_UPD.

Meanwhile, the recorded data managing section 53 instructs the hard disk control section 33 via the optical-disc-device-end communications control section 56 and the communications-device-end communications control section 31 to check if the software update data memory area 322 of the hard disk 32 contains the OS update information corresponding to the OS written to the second information storage area 40A of the optical information storage medium 200.

In so doing, the recorded data checking section 532 transmits the file management information corresponding to the OS stored in the optical information storage medium 200 to the hard disk control section 33 via the optical-disc-device-end communications control section 56 and the communications-device-end communications control section 31. The hard disk control section 33 checks if there is an identical FILE_NAME file on the basis of the FILE_NAME in the file management information. If there is OS update information of the same FILE_NAME, the section 33 checks FILE_UPD to find out if the OS update information is the latest version.

If either the software data memory section 401 in the optical-disc-device memory section 4 or the software update data memory area 322 of the hard disk 32 contains the same OS as does the first information storage area 20A of the optical information storage medium 200 ("YES"), the restoration program is exited. The operation then moves to S4.

If the recorded data checking section 532 or the hard disk control section 33 has confirmed in S5 that either the software update data memory section 402 in the optical-disc-device memory section 4 or the software update data memory area 322 of the hard disk 32 contains the latest OS update information, the operation moves to S6.

On the other hand, if the recorded data checking section 532 or the hard disk control section 33 has confirmed in S5 that neither the software update data memory section 402 in the optical-disc-device memory section 4 nor the software update data memory area 322 of the hard disk 32 contains the latest OS update information, the backup/restoration performing section 531 stops the backup program ("END").

In S6, according to the backup program, based on the FILE_SIZE for the OS update information, the storage capacity checking section 541 checks if the second information storage area 40A of the optical information storage medium 200 has a sufficient storage capacity (empty space). The operation then moves to S7.

The present invention differs from patent literature 1 in that the storage capacity checking section 541 checks for a sufficient storage capacity before making a backup for the OS update information.

In S7, if the storage capacity checking section 541 has confirmed that the second information storage area 40A of the optical information storage medium 200 has a sufficient storage capacity, the section 541 notifies the optical-disc-device display control section 55 of it ("YES"). The operation then moves to S8. On the other hand, in S6, if the second information storage area 40A of the optical information storage medium 200 dose not have a sufficient storage capacity, the section 541 notifies the backup/restoration performing section 531 of it. The backup/restoration performing section 531 stops the backup program ("END").

In this case, for example, the optical-disc-device display device 19 may produces a display saying: "You cannot write to disc."

In S8, upon receiving the notification from the user enquiry image memory section 403 in the optical-disc-device memory section 4, the optical-disc-device display control section 55 reads a user enquiry image so that the optical-disc-device display device 19 can display a prompt "Do you agree to write to disc?" The operation then moves to S9.

Alternatively, the communications-device display device 36 may display the prompt "Do you agree to write to disc?"

In S9, if a write permission is entered by the user on the optical-disc-device operating section 7 ("YES;" alternatively, the permission may be entered by the user on the communications-device keyboard 37), the operation then moves to S10.

On the other hand, in S9, if a write non-permission is entered by the user on the optical-disc-device operating section 7 ("NO"), the writing control section 54 notifies the backup/restoration performing section 531 of it. The backup/restoration performing section 531 stops the backup program ("END").

In S10, according to the backup program, if the latest OS update information is stored in the software update data memory section 402, the data recording performing section 542 reads the OS update information and writes the OS update information to the second information storage area 40A of the optical information storage medium 200 via the read/write circuit group 9. In so doing, the OS update information is overwritten starting at the address start position of the FILE_ADR in the file management information corresponding to the original OS update information, with unnecessary, remaining data being deleted. The operation then moves to S11.

On the other hand, according to the backup program, if the latest OS update information is stored in the software update data memory area 322, the data recording performing section 542 instructs the hard disk control section 33 via the optical-disc-device-end communications control section 56 and the communications-device-end communications control section 31 to read the OS update information and transmit it to the optical disc device 2.

Upon receiving the OS update information, the optical-disc-device-end communications control section 56 causes the communications data holding section 561 to temporarily hold the OS update information and notifies the data recording performing section 542 of it.

The data recording performing section 542, upon receiving the notification, writes the OS update information to the second information storage area 40A of the optical information storage medium 200 via the read/write circuit group 9. In so doing, the OS update information is overwritten starting at the address start position of the FILE_ADR in the file management information corresponding to the original OS update information, with unnecessary, remaining data being deleted. The operation then moves to S11.

In S11, the data recording performing section 542 updates the file management information written to the third information storage area 40B of the optical information storage medium 200 according to the OS update information written to the optical information storage medium 200 and notifies the backup/restoration performing section 531 of it.

The backup/restoration performing section 531, upon receiving the notification, stops the backup program ("END").

Restoration Flow (with Some Relevant Description)

In S12, according to the restoration program, the data recording performing section 542 instructs the ROM data reproduction instructing section 521 in the reproduction control section 52 to reproduce the OS stored in the first information storage area 20A of the optical information storage medium 200.

Next, the reproduced data processing section 523 causes the reproduced data holding section 533 to temporarily hold reproduced information for the OS transmitted via the reproduction circuit 16 and notifies the data recording performing section 542 of it.

The data recording performing section 542 reads the OS stored in the reproduced data holding section 533 and causes the software data memory section 401 in the optical-disc-device memory section 4 to store the OS. The operation then moves to S13.

Alternatively, the data recording performing section 542 may read the OS stored in the reproduced data holding section 533 to transmit the OS to the hard disk control section 33 via the optical-disc-device-end communications control section 56 and the communications-device-end communications control section 31, and the hard disk control section 33 may cause the software data memory area 321 of the hard disk 32 to store the received OS. When this is the case, the operation also moves to S13.

In S13, according to the restoration program, the RE data reproduction instructing section 522 in the reproduction control section 52 reads the third information storage area 40B of the optical information storage medium 200 via the read/write circuit group 9 for file management information. The file management information readout is transmitted to the reproduced data processing section 523 via the reproduction circuit 16. The reproduced data processing section 523 causes the reproduced data holding section 533 to temporarily hold the file management information readout. The operation then moves to S14.

In S14, according to the restoration program, the recorded data checking section 532 in the recorded data managing section 53 compares the FILE_NAME in the file management information with the FILE_NAME for the OS update information stored in the software update data memory section 402 in the optical-disc-device memory section 4, to check if the software update data memory section 402 contains OS update information (update information corresponding to the OS).

Meanwhile, the recorded data managing section 53 instructs the hard disk control section 33 via the optical-disc-device-end communications control section 56 and the communications-device-end communications control section 31 to check if the software update data memory area 322 of the hard disk 32 contains the OS update information corresponding to the OS written to the second information storage area 40A of the optical information storage medium 200.

In so doing, the recorded data checking section 532 transmits the file management information corresponding to the OS stored in the optical information storage medium 200 to the hard disk control section 33 via the optical-disc-device-end communications control section 56 and the communications-device-end communications control section 31. The hard disk control section 33 checks if there is an identical FILE_NAME file on the basis of the FILE_NAME in the file management information.

If neither the software data memory section 401 in the optical-disc-device memory section 4 nor the software update data memory area 322 of the hard disk 32 contains the OS update information corresponding to the OS stored in the first information storage area 20A of the optical information storage medium 200 ("No"), the operation then moves to S15.

On the other hand, if either the software data memory section 401 in the optical-disc-device memory section 4 or the software update data memory area 322 of the hard disk 32 contains OS update information corresponding to the OS stored in the first information storage area 20A of the optical information storage medium 200, the backup/restoration performing section 531 stops the restoration program ("END").

In S15, according to the restoration program, on the basis of the FILE_SIZE for the OS update information, the storage capacity checking section 541 checks the storage capacity of the software update data memory section 402 in the optical-disc-device memory section 4. Next, the storage capacity checking section 541 checks the storage capacity of the hard disk 32 with the hard disk control section 33 via the optical-disc-device-end communications control section 56 and the communications-device-end communications control section 31. The operation then moves to S16.

In S16, if it is confirmed that either the software update data memory section 402 in the optical-disc-device memory section 4 or the software update data memory area 322 of the hard disk 32 has a sufficient storage capacity, the storage capacity checking section 541 notifies the optical-disc-device display control section 55 of it ("YES"), the operation then moves to S17. On the other hand, in S16, if neither the software update data memory section 402 in the optical-disc-device memory section 4 nor the software update data memory area 322 of the hard disk 32 has a sufficient storage capacity, the section 541 notifies the backup/restoration performing section 531 of it. The backup/restoration performing section 531 stops the restoration program ("END").

In S17, upon receiving the notification from the user enquiry image memory section 403 in the optical-disc-device memory section 4, the optical-disc-device display control section 55 reads a user enquiry image so that the optical-disc-device display device 19 can display a prompt "Do you agree to write to disc?" The operation then moves to S18.

Alternatively, the communications-device display device 36 may display the prompt "Do you agree to write to disc?"

In S18, if a write permission is entered by the user on the optical-disc-device operating section 7 ("YES"; alternatively, the permission may be entered by the user on the communications-device keyboard 37), the operation then moves to S19.

On the other hand, in S18, if a write non-permission is entered by the user on the optical-disc-device operating section 7 ("NO"), the writing control section 54 notifies the backup/restoration performing section 531 of it. The backup/restoration performing section 531 stops the restoration program ("END").

In S19, according to the restoration program, the data recording performing section 542 reads the OS update information written to the second information storage area 40A of the optical information storage medium 200 and causes the software update data memory section 402 in the optical-disc-device memory section 4 to store the OS update information.

Alternatively, in S19, according to the restoration program, the data recording performing section 542 reads the OS update information written to the second information storage area 40A of the optical information storage medium 200 and transmits the OS update information to the hard disk control section 33 via the optical-disc-device-end communications control section 56 and the communications-device-end communications control section 31, to cause the software update data memory area 322 of the hard disk 32 to store the OS update information.

If the data recording performing section 542 has stored the OS update information to either the software update data memory section 402 in the optical-disc-device memory section 4 or the software update data memory area 322 of the hard disk 32, the section 542 notifies the backup/restoration performing section 531 of it. The backup/restoration performing section 531 stops the restoration program ("END").

As detailed above, the software, content, and various information including update information for use by the software and content can be easily backed up and restored with less user time and workload.

As mentioned earlier, the present invention differs from patent literature 1 in that the backup/restoration system 1 restores the OS update information.

The information storage medium of the present invention may be an information storage medium from which various information are readable and may have a first information storage area containing first data in advance and a second information storage area in which second data is readable/writeable based on the first data.

The information storage medium of the present invention may have a third information storage area in which file management information is readable/writeable for management of the second data written to the second information storage area.

The information storage medium of the present invention may be such that the first data is fixed data and that the second data is update information for the first data.

The information storage medium of the present invention may be such that the file management information is calculated based on at least one of a filename and a date and time of update.

The information storage medium of the present invention may have a fourth information storage area in which a backup processing program is recorded in advance to write the second data to the second information storage area based on the file management information written to the third information storage area.

The information storage medium of the present invention may have a fifth information storage area in which a restoration processing program is recorded in advance to restore the second data based on the file management information written to the third information storage area.

The information storage medium of the present invention may be an optical information storage medium and may include on a substrate: information recording layers readable by a read beam; a transparent layer provided farthest from the substrate; and an intermediate layer separating the individual information recording layers. The medium may also be such that: at least one of the information recording layers is a non-rewriteable recording layer; at least another one of the information recording layers is a recordable layer; the non-rewriteable recording layer is allotted in the first information storage area; and the recordable layer is allotted in the second information storage area and/or in the third information storage area.

The information storage medium of the present invention may be an optical information storage medium and may include on a substrate: information recording layers readable by a read beam; a transparent layer provided farthest from the substrate; and an intermediate layer separating the individual information recording layers. The medium may also be such that: at least one of the information recording layers is a non-rewriteable recording layer; at least another one of the information recording layers is a recordable layer; the non-rewriteable recording layer is allotted in the first information storage area, in the fourth information storage area, and/or in the fifth information storage area; and the recordable layer is allotted in the second information storage area and/or in the third information storage area.

The information read/write device of the present invention may write the second data to the second information storage area of the information storage medium on the basis of the file management information reproduced from the third information storage area of the information storage medium.

The information read/write device of the present invention may store the second data in a desired information storage area of the information read/write device on the basis of the file management information reproduced from the third information storage area of the information storage medium.

The backup system of the present invention may be such that the information processing device includes at least a primary memory device in which various data is read/written; an information read/write device for reading/writing the information storage medium; and a control section for controlling the primary memory device and the information read/write device. Furthermore, the backup system may include: first determining means for determining if the primary memory device contains the first data; second determining means for determining if the primary memory device contains the second data; third determining means for determining if the second data can be written to the second information storage area of the information storage medium; and first write means for writing the second data to the second information storage area based on results of determining by the first determining means, the second determining means, and the third determining means.

The restoration system of the present invention may be such that the information processing device includes at least a primary memory device in which various data is read/written; an information read/write device for reading/writing the information storage medium; and a control section for controlling the primary memory device and the information read/write device. Furthermore, the restoration system may include: fourth determining means for determining if the primary memory device contains the first data; second write means for writing the first data to the primary memory device based on a result of determining by the fourth determining means; fifth determining means for determining if the second information storage area of the information storage medium contains the second data; sixth determining means for determining if the second data can be written to the primary memory device; and third write means for writing the second data to the primary memory device based on results of determining by the fifth determining means and the sixth determining means.

Finally, the blocks of the backup/restoration system 1, the optical disc device 2, and the communications device 3, especially the optical-disc-device control section 5, may be implemented by hardware or software executed by a CPU as follows:

The backup/restoration system 1, the optical disc device 2, and the communications device 3 each include a CPU (central processing unit) and memory devices (storage media). The CPU executes instructions contained in control programs, realizing various functions. The memory devices may be a ROM (read-only memory) containing computer programs, a RAM (random access memory) to which the programs are loaded, or a memory containing the programs and various data. The objective of the present invention can be achieved also by mounting to the optical disc device 2 a computer-readable storage medium containing control program code (executable programs, intermediate code programs, or source programs) for the backup/restoration system 1, the optical disc device 2, and the communications device 3, which is software implementing the aforementioned functions, in order for a computer (or CPU, MPU) to retrieve and execute the program code contained in the storage medium.

The storage medium may be, for example, a tape, such as a magnetic tape or a cassette tape; a magnetic disk, such as a Floppy® disk or a hard disk, or an optical disc, such as a CD-ROM/MO/MD/DVD/CD-R; a card, such as an IC card (memory card) or an optical card; or a semiconductor memory, such as a mask ROM/EPROM/EEPROM/flash ROM.

The backup/restoration system 1, the optical disc device 2, and the communications device 3 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, a wired line, such as IEEE 1394, USB, an electric power line, a cable TV line, a telephone line, or an ADSL; or wireless, such as infrared (IrDA, remote control), Bluetooth®, 802.11 wireless, HDR, a mobile telephone network, a satellite line, or a terrestrial digital network.

The information storage medium of the present invention may be such that the second information is update information for use by the first information.

In other words, the second information is information for use by the software or content (first information): for example, update information for security improvement and installation of the latest version for application software and user settings information for functionality desired by the user.

The second information includes: movie correction information for use in correction, moderation, modification, revision, comparison, and similar corrective manipulations for defects in content (first information), such as movie and audio; various additional information to be added to content for use in effective utilization of the content; and various attached information to be attached to the content.

A plug-in (add-in) is an addition of a new function to the standard functions of application software (first information). The second information also includes such information (second information) that the plug-in function is realized by add-in software. When the first information is a database, the second information further includes additional data for use by the database.

The information storage medium of the present invention may be such that: it includes on a substrate: information recording layers readable by a read beam; a transparent layer provided farthest from the substrate; and an intermediate layer separating the individual information recording layers; at least one of the information recording layers is a first information recording layer which is read-only; at least another one of the information recording layers is a second information recording layer which is either write-once or rewriteable; the first information storage area is allotted in the first information recording layer; and the second information storage area is allotted in the second information recording layer.

According to the configuration, the information storage medium has information recording layers from each of which information can be read by a read beam.

The information recording layer has, for example, an information storage area or an information storage surface where information is stored and refers to a single layer or multiple layers of reflective film, storage film, or like film which has a particular storage-enabling property or to predetermined segments of a read-beam-hitting interface between two layers extending in the in-plane direction.

The first, second, and other various information stored in the information storage medium of the present invention is a concept inclusive of cases where the information is contained in the information storage medium in advance before shipping, by a user after shipping, and through the operation of the information read/write device and the coordination system after shipping which will be described later.

The information storage medium includes at least one read-only first information recording layer (ROM layer).

In addition, at least one of the other non-first information recording layers is a write-once or rewriteable second information recording layer (an R or an RE layer).

In other words, the information storage medium is a "hybrid optical information storage medium" containing a combination of ROM, RE, R, and/or other information recording layers with different storage-enabling properties.

"Write-once" means that information can be read and written, but not erased.

The information storage medium having the foregoing structure is an "optical information storage medium." The first information storage area is allotted in the first information recording layer, and the second information storage area is allotted in the second information recording layer.

Therefore, the first information storage area in the ROM layer can contain "fixed data (first information)," such as software and application software, in advance.

In addition, the second information storage area in the R or RE layer is available for writing the second information for use by the first information.

Thus, the present invention is applicable to the hybrid optical information storage medium. The medium has an increased storage capacity over monolayer information storage media.

The information storage medium of the present invention may further include a third information storage area, wherein the third information storage area (is allotted in the second information recording layer and) is available for writing file management information for file-to-file management of information written to the second information storage area.

According to the configuration, the information written to the second information storage area can be managed on a file-to-file basis according to the file management information.

That in turn enables management of all data manipulable on the PC (characters, numeric values, images, audio, programs, etc.) by placing them in the file.

The information storage medium of the present invention may be preferably such that: the file management information includes file attribute information representing file attributes; and the second information is written according to the file attribute information.

The "file attribute information" is information, such as filename, size, date and time of creation, and date and time of update, given to a file.

Thus, for example, files (i.e., plural sets of second information) can be physically distinguished by filename, file ID (identification), etc. in managing them and temporally distinguished by the date and time of update of the files in managing them. Accordingly, for example, taking update information as an example, the latest update information of plural sets of first information which is for use by a particular set of first information can be identified.

The information storage medium of the present invention may further include a fourth information storage area, wherein the fourth information storage area (is allotted in the first information recording layer and) contains, in advance, a backup processing program which makes a backup by writing the second information to the second information storage area of the medium.

The configuration enables, for example, automatic execution of a backup, for example, when the information storage medium of the present invention is loaded into, for example, an information read/write device as will be described in the following.

A "(computer) program" is such a combination of instructions as to run a computer. The term is inclusive of programs in any stage, may they be executable programs, intermediate code programs, or source code programs. The same description applies to the various programs which appear below.

The information storage medium of the present invention, in addition to the foregoing configuration, preferably further includes a fifth information storage area, wherein the fifth information storage area (is allotted in the first information recording layer and) contains, in advance, a restoration processing program which performs restoration by storing the first information and the second information in a storage medium other than the medium.

The configuration enables, for example, automatic execution of a restoration, for example, when the information storage medium of the present invention is loaded into, for example, an information read/write device as will be described in the following.

A coordination system of the present invention may be a coordination system for coordinating operation of the information read/write device and an information communications device capable of communicating with the information read/write device, wherein: the information communications device includes a communications-device storage section for storing information; the second information verification means verifies whether the communications-device storage section contains or does not contain the second information; the information communications device includes transmission control means for, if the second information verification means has verified that the communications-device storage section contains the second information, transmitting the second information to the information read/write device; the information read/write device includes reception control means for receiving the second information transmitted from the transmission control means; the writing control means in the information read/write device writes the second information received by the reception control means to the second information storage area of the information storage medium.

According to the configuration, the coordination system is a coordination between the information read/write device and an information communications device capable of communicating with the information read/write device. "Communications" here may be either wired or wireless.

According to the configuration, the information communications device in the coordination system includes a communications-device storage section for storing information. Accordingly, the coordination system is capable of storing information in the communications-device storage section.

According to the configuration, the second information verification means checks if the communications-device storage section contains the second information. If the second information verification means has confirmed that the communications-device storage section contains the second information, the transmission control means of the information communications device transmits the second information to the information read/write device.

Accordingly, the transmission control means transmits the second information to the information read/write device only if the second information verification means has confirmed that the communications-device storage section contains the second information. Unnecessary transmission of the second information is thus prevented.

According to the configuration, the reception control means of the information read/write device receives the second information transmitted from the transmission control means.

According to the configuration, the writing control means of the information read/write device writes the second information received by the reception control means to the second information storage area of the information storage medium.

Accordingly, a backup of the second information can be made by writing the second information from the communications-device storage section of the information communications device capable of communicating with the information read/write device to the second information storage area of the information storage medium.

Another coordination system of the present invention may, in addition to the foregoing configuration, be a coordination system for coordinating operation of the information read/write device and an information communications device capable of communicating with the information read/write device, wherein: the information communications device includes a communications-device storage section for storing information; the first information verification means verifies whether the communications-device storage section contains or does not contain the first information; the second information verification means verifies whether the communications-device storage section contains or does not contain the second information; the information read/write device includes transmission control means for, if the first information verification means has verified that the communications-device storage section does not contain the first information, transmitting the first information contained in the first information storage area of the information storage medium or for, if the second information verification means has verified that the communications-device storage section does not contain the second information, transmitting the second information written to the second information storage area of the information storage medium; and the information communications device includes: reception control means for receiving the first information or the second information from the information read/write device; and writing control means for storing the first information or the second information received by the reception control means in the communications-device storage section.

According to the configuration, the coordination system is a coordination between the information read/write device and an information communications device capable of communicating with the information read/write device. "Communications" here may be either wired or wireless.

According to the configuration, the information communications device in the coordination system includes a communications-device storage section for storing information. Accordingly, the coordination system is capable of writing information to the communications-device storage section.

According to the configuration, the first information verification means checks if the communications-device storage section contains the first information. If the first information verification means has confirmed that the communications-device storage section does not contain the first information, the transmission control means transmits the first information to the information communications device.

Meanwhile, the second information verification means checks if the communications-device storage section contains the second information. If the second information verification means has confirmed that the communications-device storage section does not contain the second information, the transmission control means transmits the second information to the information communications device.

Accordingly, the transmission control means transmits the first information or the second information to the information communications device only if the first information verification means has confirmed that the communications-device storage section does not contain the first information or if the second information verification means has confirmed that the communications-device storage section does not contain the second information. Unnecessary transmission of the first information or the second information is thus prevented.

According to the configuration, the reception control means of the information communications device receives the first information or the second information from the information read/write device.

According to the configuration, the writing control means of the information communications device writes the first information received by the reception control means or the second information received by the reception control means to the communications-device memory section of the information communications device.

Accordingly, restoration is performed by storing the first information or the second information from the first information storage area or the second information storage area of the information storage medium in the communications-device storage section of the information communications device capable of communicating with the information read/write device.

The information read/write device, the information communications device, the coordination system including these devices for coordination between them, the individual means, functions, steps, and processes for the devices or the control method for the coordination system may be computer-implemented. When that is the case, the present invention encompasses a control program for the information read/write device, a control program for the information communications device, and a control program for the coordination system executed on a computer to realize the information read/write device, the information communications device, the coordination system, and the control method for the devices or the coordination system by operating the computer as the individual means, realizing the functions on the computer, or executing the steps and processes on the computer. The invention also encompasses a computer-readable storage medium containing the programs.

The computer program of the present invention may be a control program encoded on a computer-readable storage medium, wherein the information read/write device further includes the computer-readable storage medium, the control program upon implementation by a computer realizing the individual means of the information read/write device.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is broadly applicable to various information storage media: tapes, such as magnetic tapes or cassette tapes; magnetic disks, such as floppy disks or hard disks, or optical discs, such as CD-ROMs/MOs/MDs/DVDs/CD-Rs; card, such as IC cards (memory cards) or optical cards; or semiconductor memories, such as mask ROMs/EPROMs/EEPROMs/flash ROMs. The invention is also broadly applicable to optical information storage media with a multilayered structure of a ROM layer, an RE layer, and an R layer. Furthermore, the invention is broadly applicable to a method of making a backup in a PC, a mobile device, a mobile phone, an information processing device, or an information storage medium outside the information communications device, a method of making a backup in a server network-connected to an information processing device or an information communications device, and a method of making a backup in a hard disk device connected to an information processing device or information communications device.

REFERENCE SIGNS LIST

1 Backup/Restoration System (Coordination System)
2 Optical Disc Device (Information Read/Write Device)
3 Communications Device (Information Communications Device)
4 Optical-disc-device Memory Section (Other Storage Medium, Storage Section)
5 Optical-disc-device Control Section
6 Disc Loading Detecting Section
7 Optical-disc-device Operating Section
8 Optical Pickup
9 Read/write Circuit Group
10 Transparent Layer
11 Actuator
12 Optical Head
13 Spindle Motor
14 Pickup Driver Circuit
15 Laser Driver Circuit
16 Reproduction Circuit
17 Actuator Driver Circuit
18 Spindle Motor Driver Circuit
19 Optical-disc-device Display Device
20 First Information Recording Layer (Read-only Layer, Information Recording Layer)
20A First Information Storage Area
20B Fourth Information Storage Area
20C Fifth Information Storage Area
30 Intermediate Layer
31 Communications-device-end Communications Control Section (Reception Control Means, Transmission Control Means)
32 Hard Disk (Other Storage Medium, Communications-device Storage Section)
33 Hard Disk Control Section (Writing Control Means, First Information Verification Means, Second Information Verification Means)
34 Communications-device Control Section
35 Communications-device Memory
36 Communications-device Display Device
37 Communications-device Keyboard
40 Second Information Recording Layer (Write-once or Rewriteable Layer, Information Recording Layer)
40A Second Information Storage Area
40B Third Information Storage Area
50 Substrate
51 Disc Managing Section
52 Reproduction Control Section
53 Recorded Data Managing Section (First Information Verification Means, Second Information Verification Means)
54 Writing Control Section (Writing Control Means)
55 Optical-disc-device Display Control Section
56 Optical-disc-device-end Communications Control Section (Transmission Control Means, Reception Control Means)
57 Pickup Control Section
58 Laser Control Section
200, 201 Optical Information Storage Medium (Information Storage Medium)
321 Software Data Memory Area (Other Storage Medium, Communications-device Storage Section)
322 Software Update Data Memory Area (Other Storage Medium, Communications-device Storage Section)
401 Software Data Memory Section (Other Storage Medium, Storage Section)
402 Software Update Data Memory Section (Other Storage Medium, Storage Section)
403 user enquiry image memory section
521 ROM Data Reproduction Instructing Section
522 RE Data Reproduction Instructing Section
523 Reproduced Data Processing Section
531 Backup/Restoration Performing Section 532 Recorded Data Checking Section (First Information Verification Means, Second Information Verification Means)
533 Reproduced Data Holding Section
541 Storage Capacity Checking section
542 Data Recording Performing Section
561 Communications Data Holding Section
OS (Operating System; First Information, Software)
Mpeg Data (mpeg file; First Information, Content)
OS Update Information (Second Information, Update Information)
Movie Correction Information (Second Information)
FILE_NAME (File Attribute Information)
FILE_ADR (File Attribute Information)
FILE_TYPE (File Attribute Information)
FILE_SIZE (File Attribute Information)
FILE_UPD (File Attribute Information)

The invention claimed is:

1. An information-readable information storage medium, comprising at least a first information storage area and a second information storage area, wherein:
the first information storage area contains, in advance, first information which is either software or content;
the second information storage area is either write-once or rewriteable and is available for writing second information for use by the first information;
said medium includes on a substrate: information recording layers readable by a read beam; a transparent layer provided farthest from the substrate; and an intermediate layer separating the individual information recording layers;
at least one of the information recording layers is a first information recording layer which is read-only;
at least another one of the information recording layers is a second information recording layer which is either write-once or rewriteable;
the first information storage area is allotted in the first information recording layer; and
the second information storage area is allotted in the second information recording layer.

2. The information storage medium as set forth in claim 1, wherein the second information is update information for use by the first information.

3. The information storage medium as set forth in claim 1, further comprising a third information storage area, wherein the third information storage area is allotted in the second information recording layer and available for writing file management information for file-to-file management of information written to the second information storage area.

4. The information storage medium as set forth in claim 3, wherein:
the file management information includes file attribute information representing file attributes; and
the second information is written according to the file attribute information.

5. The information storage medium as set forth in claim 1, further comprising a fourth information storage area, wherein the fourth information storage area is allotted in the first information recording layer and contains, in advance, a backup processing program which makes a backup by writing the second information to the second information storage area of said medium.

6. The information storage medium as set forth in claim 1, further comprising a fifth information storage area, wherein the fifth information storage area is allotted in the first information recording layer and contains, in advance, a restoration processing program which performs restoration by storing the first information and the second information in a storage medium other than said medium.

7. An information read/write device writing/reading information on an information-readable information storage medium including at least a first information storage area and a second information storage area, wherein:
the first information storage area contains, in advance, first information which is software or content; and
the second information storage area is either write-once or rewriteable and available for writing second information for use by the first information,
said device comprising:
a storage section for storing information;
second information verification means for verifying whether the storage section contains or does not contain the second information; and
writing control means for, if the second information verification means has verified that the storage section contains the second information, writing the second information to the second information storage area of the information storage medium.

8. A computer-readable storage medium containing the control program for an information read/write device as set forth in claim 7.

9. A coordination system for coordinating operation of the information read/write device as set forth in claim 7 and an information communications device capable of communicating with the information read/write device, wherein:
the information communications device includes a communications-device storage section for storing information;
the second information verification means verifies whether the communications-device storage section contains or does not contain the second information;
the information communications device includes transmission control means for, if the second information verification means has verified that the communications-device storage section contains the second information, transmitting the second information to the information read/write device;
the information read/write device includes reception control means for receiving the second information transmitted from the transmission control means;
the writing control means in the information read/write device writes the second information received by the reception control means to the second information storage area of the information storage medium.

10. A computer-readable storage medium containing the control program for a coordination system as set forth in claim 9.

11. An information read/write device writing/reading information on an information-readable information storage medium including at least a first information storage area and a second information storage area, wherein:
the first information storage area contains, in advance, first information which is software or content; and
the second information storage area is either write-once or rewriteable and available for writing second information for use by the first information,
said device comprising:
a storage section for storing information;
first information verification means for verifying whether the storage section contains or does not contain the first information;
second information verification means for verifying whether the storage section contains or does not contain the second information;

writing control means for, if the first information verification means has verified that the storage section does not contain the first information, storing the first information in the storage section or for, if the second information verification means has verified that the storage section does not contain the second information, storing the second information in the storage section.

12. A computer-readable storage medium containing the control program for an information read/write device as set forth in claim 11.

13. A coordination system for coordinating operation of the information read/write device as set forth in claim 11 and an information communications device capable of communicating with the information read/write device, wherein:

the information communications device includes a communications-device storage section for storing information;

the first information verification means verifies whether the communications-device storage section contains or does not contain the first information;

the second information verification means verifies whether the communications-device storage section contains or does not contain the second information;

the information read/write device includes transmission control means for, if the first information verification means has verified that the communications-device storage section does not contain the first information, transmitting the first information contained in the first information storage area of the information storage medium or for, if the second information verification means has verified that the communications-device storage section does not contain the second information, transmitting the second information written to the second information storage area of the information storage medium; and the information communications device includes: reception control means for receiving the first information or the second information from the information read/write device; and writing control means for storing the first information or the second information received by the reception control means in the communications-device storage section.

14. A computer-readable storage medium containing the control program for a coordination system as set forth in claim 13.

* * * * *